US010404922B2

United States Patent
Hong et al.

(10) Patent No.: US 10,404,922 B2
(45) Date of Patent: Sep. 3, 2019

(54) IMAGE CAPTURING APPARATUS WITH FLICKER COMPENSATION AND METHOD OF OPERATING THE SAME

(71) Applicant: SAMSUNG ELECTRONICS CO., LTD., Suwon-si, Gyeonggi-do (KR)

(72) Inventors: Hyun-seok Hong, Suwon-si (KR); Yeong-rok Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 113 days.

(21) Appl. No.: 15/293,520

(22) Filed: Oct. 14, 2016

(65) Prior Publication Data

US 2017/0201668 A1 Jul. 13, 2017

(30) Foreign Application Priority Data

Jan. 13, 2016 (KR) ........................ 10-2016-0004409

(51) Int. Cl.
*H04N 9/73* (2006.01)
*H04N 5/235* (2006.01)
*H04N 5/238* (2006.01)

(52) U.S. Cl.
CPC ........... *H04N 5/2357* (2013.01); *H04N 5/238* (2013.01); *H04N 5/2353* (2013.01)

(58) Field of Classification Search
CPC .................................................. H04N 5/2357
USPC .................................................... 348/226.1
See application file for complete search history.

(56) References Cited

U.S. PATENT DOCUMENTS

| 7,817,201 | B2 | 10/2010 | Shmizu et al. | |
|---|---|---|---|---|
| 9,794,493 | B2 | 10/2017 | Ariga | |
| 2009/0128683 | A1* | 5/2009 | Matsumoto | ........ H04N 5/23212 348/345 |
| 2010/0123810 | A1* | 5/2010 | Greenland | ............. G03B 19/18 348/294 |
| 2011/0181753 | A1* | 7/2011 | Sugie | ................. H04N 5/23296 348/226.1 |
| 2014/0333825 | A1 | 11/2014 | Nakagawara | |

FOREIGN PATENT DOCUMENTS

| CN | 1787614 A | 6/2006 |
|---|---|---|
| CN | 101001325 A | 7/2007 |
| CN | 103108132 A | 5/2013 |
| CN | 104601904 A | 5/2015 |

(Continued)

OTHER PUBLICATIONS

Chinese Office Action dated May 30, 2019 for CN Application No. 201710028358.9.

*Primary Examiner* — Usman A Khan
(74) *Attorney, Agent, or Firm* — Nixon & Vanderhye P.C.

(57) ABSTRACT

An image capturing apparatus and a method of operating the same are provided. The image capturing apparatus includes: an imaging device configured to obtain, based on a previously set exposure condition, an imaging signal that corresponds to at least one frame; a flicker information determining circuitry configured to determine flicker information of a light source using the imaging signal that corresponds to the at least one frame; and a controller configured to control, based on the flicker information of the light source, an exposure start time of the imaging device in order to take into account flicker occurrence due to the light source.

18 Claims, 11 Drawing Sheets

(56) References Cited

FOREIGN PATENT DOCUMENTS

| | | |
|---|---|---|
| JP | 2014-220764 | 11/2014 |
| JP | 2015-056758 | 3/2015 |
| KR | 10-2015-0088645 | 8/2015 |

\* cited by examiner

IMAGE CAPTURING APPARATUS WITH FLICKER COMPENSATION AND METHOD OF OPERATING THE SAME

CROSS-REFERENCE TO RELATED APPLICATION

This application is based on and claims priority under 35 U.S.C. § 119 to Korean Patent Application No. 10-2016-0004409, filed on Jan. 13, 2016, in the Korean Intellectual Property Office, the disclosure of which is incorporated by reference herein in its entirety.

BACKGROUND

1. Field

The present disclosure relates to image capturing apparatuses and methods of operating the same.

2. Description of Related Art

A scene from the perspective of an image capturing apparatus may be captured in proportion to brightness of an external light source, such as solar light or lighting, besides characteristics of an object in the scene. Brightness of the solar light or light-emitting diode (LED) lighting rarely changes over a certain period of time within a few seconds. However, brightness of incandescent light, fluorescent light, or the like that uses alternating current (AC) power changes at a rate proportional to a frequency of the power. Accordingly, in high-speed sequential image capturing for which a short period of exposure time is allowed, a flicker phenomenon in which, even with respect to the same scene, brightness of images of the scene differs between captured sequential images, may occur.

SUMMARY

Methods and image capturing apparatuses for avoiding and/or reducing occurrence of flicker in a captured image due to a light source, based on flicker information of the light source are provided.

Additional aspects will be set forth in part in the description which follows and, in part, will be apparent from the description.

According to an aspect of an example embodiment, an image capturing apparatus includes: an imaging device including imaging circuitry configured to obtain, based on a previously set exposure condition, an imaging signal that corresponds to at least one frame; a flicker information determining circuitry configured to determine flicker information of a light source using the imaging signal that corresponds to the at least one frame; and a controller configured to control, based on the flicker information of the light source, an exposure start time of the imaging device in order to reduce flicker occurrence due to the light source.

The controller may be configured to control, based on the flicker information of the light source, an exposure time period with respect to each line of the imaging device in order to reduce the flicker occurrence due to the light source.

The controller may be configured to determine, based on the flicker information of the light source, a compensation gain value with respect to each line of the imaging device and to apply the compensation gain value of each line to the at least one frame.

The controller may be configured to determine, based on the flicker information of the light source, an exposure start time for reducing the flicker occurrence due to the light source and to control the exposure start time of the imaging device based on the determined exposure start time.

The controller may be configured to determine, in a liveview mode, an exposure time period and an exposure start time for the flicker occurrence with respect to the light source, and the imaging device may be configured to obtain, based on the determined exposure time period and the exposure start time, the imaging signal that corresponds to the at least one frame.

The controller may be configured to determine the exposure time period and exposure start time by maintaining or changing a liveview frames per second (FPS) rate.

The controller may be configured to determine, based on the flicker information of the light source, whether flicker due to the light source has occurred in the at least one frame, and to control, when it is determined that the flicker due to the light source has occurred, the exposure start time of the imaging device in order to reduce the flicker occurrence due to the light source.

The flicker information of the light source may include at least one selected from phase information of the light source, power frequency information of the light source, amplitude information of the light source, and average brightness information of the light source.

The exposure start time of the imaging device may include a time when a central region of the imaging device receives brightest light.

The imaging device may be configured to obtain, based on the exposure start time controlled by the controller, an imaging signal that corresponds to a still image or video image, the flicker information determining circuitry may be configured to update the flicker information of the light source using the imaging signal that corresponds to the still image or video image, and the controller may be configured to control, based on the updated flicker information of the light source, the exposure start time of the imaging device in order to reduce the flicker occurrence due to the light source.

The imaging device may be configured to obtain, based on the exposure start time controlled by the controller, an imaging signal that corresponds to a still image or video image, and to control, based on a position of a brightest line of lighting detected in the still image or video image, the exposure start time of the imaging device.

The imaging device may be configured to obtain, based on the previously set exposure condition, an imaging signal that corresponds to a partial region of the at least one frame, and the flicker information determining circuitry may be configured to determine the flicker information of the light source by using the imaging signal that corresponds to the partial region of the at least one frame.

According to an aspect of another example embodiment, an image capturing apparatus includes: an imaging device configured to obtain, based on a previously set exposure condition, an imaging signal that corresponds to at least one frame; a flicker information determining circuitry configured to determine flicker information of a light source using the imaging signal that corresponds to the at least one frame; and a controller configured to control, based on the flicker information of the light source, an exposure time period with respect to each line of the imaging device in order to reduce flicker occurrence due to the light source.

According to an aspect of another example embodiment, an image capturing apparatus includes: an imaging device configured to obtain, based on a previously set exposure condition, an imaging signal that corresponds to at least one frame; a flicker information determining circuitry configured to determine flicker information of a light source using the imaging signal that corresponds to the at least one frame; and a controller configured to determine, based on the flicker information of the light source, a compensation gain value with respect to each line of the imaging device and apply the compensation gain value of each line to the at least one frame.

According to an aspect of another example embodiment, a method of operating an image capturing apparatus includes: obtaining, based on a previously set exposure condition, an imaging signal that corresponds to at least one frame; determining flicker information of a light source using the imaging signal that corresponds to the at least one frame; and controlling, based on the flicker information of the light source, an exposure start time of the imaging device in order to reduce flicker occurrence due to the light source.

According to an aspect of another example embodiment, a method of operating an image capturing apparatus includes: obtaining, based on a previously set exposure condition, an imaging signal that corresponds to at least one frame; determining flicker information of a light source using the imaging signal that corresponds to the at least one frame; and controlling, based on the flicker information of the light source, an exposure time period with respect to each line of the imaging device in order to reduce flicker occurrence due to the light source.

According to an aspect of another example embodiment, a method of operating an image capturing apparatus includes: obtaining, based on a previously set exposure condition, an imaging signal that corresponds to at least one frame; determining flicker information of a light source using the imaging signal that corresponds to the at least one frame; and determining, based on the flicker information of the light source, a compensation gain value with respect to each line of the imaging device and applying the compensation gain value of each line to the at least one frame.

According to an aspect of another example embodiment, a non-transitory computer-readable recording medium having recorded thereon a program for implementing the above method is provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
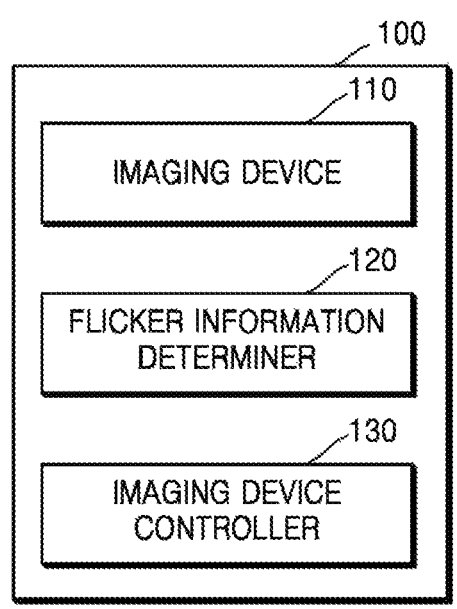
FIG. 1 is a diagram illustrating an example image capturing apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used in the present disclosure will be described briefly, and embodiments will then be described in detail.

The terms used in the present disclosure are those general terms currently widely used in the art in consideration of functions in regard to the disclosure, but the terms may vary according to the intention of one of ordinary skill in the art, precedents, or new technology in the art. Also, specified terms may be selected by the applicant, and in this case, the detailed meaning thereof will be described in the detailed description. Thus, the terms used in the present disclosure should be understood not as simple names but based on the meaning of the terms and the overall description.

Throughout the description, it will be understood when a part "includes" or "comprises" an element, unless there is a particular description contrary thereto, the part can further include other elements, not excluding the elements. Also, the terms "unit", "-er", "-or" and "module" used herein represent a unit for processing at least one function or operation, which may be implemented by hardware, software, or a combination of hardware and software.

Throughout the description, it will be understood that when an element is referred to as being "connected" to another element, it may be "directly connected" to the other element or "electrically connected" to the other element with intervening elements therebetween.

An image capturing apparatus 100 or 1100*a* that is mentioned throughout the description may be implemented in various forms such as a digital still camera that captures a still image or a digital video camera that captures a video image. In addition, the image capturing apparatus 100 or 1100*a* may include a digital single lens reflex (DSLR) camera, a mirrorless camera, or the like. Furthermore, the image capturing apparatus 100 or 1100*a* may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG-1 Audio Layer-3 (MP3) player, a mobile medical device, and a wearable device. The image capturing apparatus 100 or 1100*a* is not limited to the above-described devices and may include an electronic apparatus including a camera module that includes a lens and an imaging device to capture and generate an image of a subject.

Flicker that is mentioned throughout the description may refer to, when an image is captured under a light source, such as fluorescent light, that has a periodical deviation in emission intensity due to power having a certain frequency, a brightness difference between images captured with respect to the same scene, the difference occurring due to a temporal deviation of the light source in emission intensity in a captured image. That is, flicker with respect to a light source may occur in captured images of different frames or in different lines in a captured image of one frame.

The embodiments will now be described with reference to the accompanying drawings in such a manner that the embodiments may be easily practiced by one of ordinary skill in the art.

FIG. 1 is a diagram illustrating an example image capturing apparatus 100 according to an example embodiment.

According to the present example embodiment, the image capturing apparatus 100 may include an imaging device 110, a flicker information determiner (e.g., including information determining circuitry, such as, for example, and without limitation processing circuitry) 120, and an imaging device controller 130. FIG. 1 illustrates the image capturing apparatus 100 including only the elements related to the present embodiment. However, it will be understood by one of ordinary skill in the art related to the present embodiment that the image capturing apparatus 100 may further include other general-purpose elements in addition to the elements illustrated in FIG. 1.

The imaging device 110 may obtain, based on a previously set exposure condition, an imaging signal that corresponds to at least one frame. According to an embodiment, the previously set condition may be an exposure condition for occurrence of flicker with respect to a light source. In detail, the imaging device controller 130 may determine an exposure start time and an exposure time period, which are exposure conditions for forcing the occurrence of flicker with respect to the light source, and the imaging device 110 may obtain, based on the determined exposure start time and exposure time period, the imaging signal that corresponds to the at least one frame. For example, the imaging device controller 130 may determine, by taking into account power having a frequency of 60 Hz, an exposure time period that is shorter than 1/120 sec as an exposure condition for forcing the occurrence of flicker with respect to the light source.

In addition, according to an embodiment, the imaging device controller 130 may set, with respect to a partial region of the imaging device 110, an exposure condition for forcing the occurrence of flicker with respect to the light source. For example, the imaging device controller 130 may set an exposure time period regarding an upper partial region and a lower partial region of the imaging device 110 to be shorter than an exposure time period of other regions so that the upper partial region and the lower partial region of the imaging device 110 may be used to determine flicker information and the other regions may be used to store a still image or video image.

In addition, the imaging device 110 may include a plurality of lines, and the plurality of lines may be lines of a plurality of pixels or lines of a plurality of sub-pixels, respectively.

In addition, in a state where a frames per second (FPS) rate is constant, the imaging device 110 may obtain, according to an exposure condition for the occurrence of flicker with respect to the light source, an imaging signal that corresponds to at least one frame. In addition, according to another embodiment, in a state where the FPS rate has changed, the imaging device 110 may obtain, according to an exposure condition for the occurrence of flicker with respect to the light source, an imaging signal that corresponds to at least one frame.

In addition, in a liveview mode, the imaging device 110 may obtain, according to an exposure condition for the occurrence of flicker with respect to the light source, an imaging signal that corresponds to at least one frame. According to an embodiment, in a state where a liveview FPS rate is constant, the imaging device 110 may obtain, according to an exposure condition for the occurrence of flicker with respect to the light source, an imaging signal that corresponds to at least one frame. In addition, according to another embodiment, in a state where the liveview FPS rate has changed, the imaging device 110 may obtain, according to an exposure condition for the occurrence of flicker with respect to the light source, an imaging signal that corresponds to at least one frame. Detailed embodiments will be described with reference to FIGS. 2 and 3.

In addition, according to an embodiment, when an exposure time period that is set by a user is less than a predetermined value, the imaging device 110 may obtain, based on a previously set exposure condition, an imaging signal that corresponds to at least one frame. For example, when an exposure time period that is set by a user is less than a predetermined value, flicker is highly likely to occur, and thus, the imaging device 110 may obtain, based on an exposure condition for forcing the occurrence of flicker, an imaging signal that corresponds to at least one frame.

Figure 2:
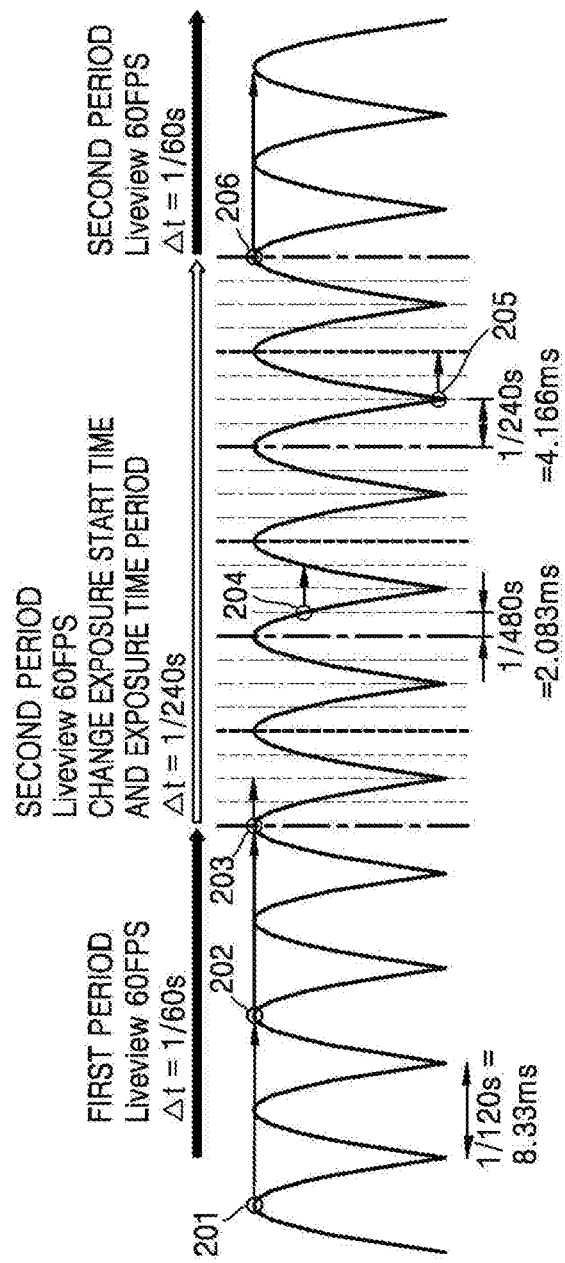
FIG. 2 is a diagram illustrating an example in which, in a state where a liveview frames per second (FPS) rate is constant, an imaging device obtains, based on an exposure condition for occurrence of flicker with respect to a light source, an imaging signal that corresponds to at least one frame.

FIG. 2 is a diagram illustrating an example in which, in a state where a liveview FPS rate is constant, the imaging device 110 obtains, according to an exposure condition for occurrence of flicker with respect to a light source, an imaging signal that corresponds to at least one frame.

As illustrated in FIG. 2, in a state where the liveview FPS rate is constantly maintained at 60 FPS over an entire period, the imaging device 110 may obtain, according to an exposure condition for the occurrence of flicker with respect to the light source, an imaging signal that corresponds to at least one frame. A curve graph in FIG. 2 is an example showing a change in brightness of the light source. An arrow denotes a beginning and end of exposure, and Δt denotes an exposure time period that corresponds to a length of the arrow. Δt and an FPS value of each period denote example values based on the assumption that 60 Hz is prime power frequency.

During a first period, the imaging device 110 may obtain, according to exposure start times 201 and 202 and an exposure time period of 1/60 s, an imaging signal that corresponds to at least one frame.

Next, during a second period, in a state where the liveview FPS rate is constant at 60 FPS, the imaging device 110 may obtain, according to an exposure condition for the occurrence of flicker with respect to the light source, an imaging signal that corresponds to at least one frame. That is, the imaging device 110 may obtain, according to exposure start times 203, 204, and 205 and an exposure time period of 1/240 s, which are exposure conditions, an imaging signal of three frames.

Next, during a third period, on the same condition as in the first period, the imaging device 110 may obtain, according to an exposure start time 206 and an exposure time period of 1/60 s, an imaging signal that corresponds to at least one frame.

Figure 3:
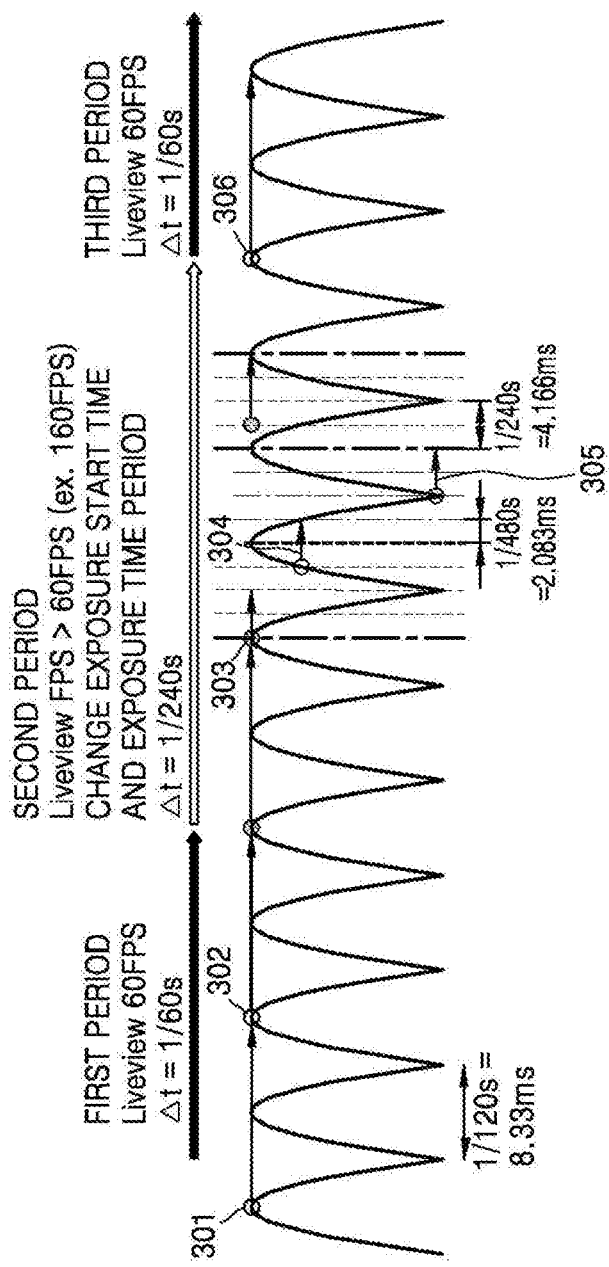
FIG. 3 is a diagram illustrating an example in which, in a state where a liveview FPS rate has changed, an imaging device obtains, according to an exposure condition for occurrence of flicker with respect to a light source, an imaging signal that corresponds to at least one frame.

FIG. 3 is a diagram illustrating an example in which, in a state where a liveview FPS rate has changed, the imaging device 110 obtains, according to an exposure condition for occurrence of flicker with respect to a light source, an imaging signal that corresponds to at least one frame. A curve graph in FIG. 3 is an example showing a change in brightness of the light source. An arrow denotes a beginning and end of exposure, and Δt denotes an exposure time period that corresponds to a length of the arrow. Δt and an FPS value of each period denote example values based on the assumption that 60 Hz is prime power frequency.

During a first period, in a state where the liveview FPS rate is 60 FPS, the imaging device 110 may obtain, according to exposure start times 301 and 302 and an exposure time period of 1/60 s, an imaging signal that corresponds to at least one frame.

Next, during a second period, the liveview FPS rate may be changed from 60 FPS to an FPS higher than 60 FPS, for example, 160 FPS, and the imaging device 110 may obtain, according to an exposure condition for the occurrence of flicker with respect to the light source, an imaging signal that corresponds to at least one frame. That is, the imaging device 110 may obtain, according to exposure start times 303, 304, and 305 and an exposure time period of 1/240 s that is less than a maximum exposure time period allowable by the changed FPS rate, which are exposure conditions, an imaging signal of three frames. Next, according to an embodiment, in a third period, the liveview FPS rate may be changed to 60 FPS again.

Next, during the third period, in a state where the liveview FPS rate is 60 FPS, the imaging device 110 may obtain, according to an exposure start time 306 and an exposure time period of 1/60 s, an imaging signal that corresponds to at least one frame.

The flicker information determiner 120 of FIG. 1 may determine flicker information of the light source by using an imaging signal that corresponds to at least one frame, the imaging signal being obtained by the imaging device 110. According to an embodiment, by using the imaging signal that corresponds to the at least one frame, the flicker information determiner 120 may determine power frequency information of the light source, phase information of the light source, amplitude information of the light source, and average brightness information of the light source regarding a scene that is not affected by the light source, which are pieces of flicker information of the light source. For example, during the second period of FIG. 3, the flicker information determiner 120 may determine flicker information of the light source by using the obtained imaging signal that corresponds to the at least one frame.

The following detailed description is of an embodiment in which the flicker information determiner (e.g., including information determining circuitry, such as, for example, and without limitation, processing circuitry) 120 determines flicker information of the light source.

According to an embodiment, energy $E_{lamp}(t)$ of the light source, at a time t, due to alternating current (AC) power may be defined as Equation 1.

$$E_{lamp}(t) = A_e \sin(2\pi f_{lamp}(t - t_{\varnothing_e}))$$ [Equation 1]

In Equation 1, $A_e$ denotes a power amplitude of the light source, $f_{lamp}$ denotes a power frequency of the light source, and $t_{\varnothing_e}$ denotes a power phase of the light source. Also, a reference time (t=0) of the time t may denote an exposure start time of a first image used to determine the flicker information.

In addition, based on the energy of the light source that is defined by Equation 1, the flicker information determiner 120 may determine $L_{measure}(t)$, which is brightness of light exposed to the imaging device 110, by using Equation 2.

$$L_{measure}(t) = \int_t^{t+\Delta t} A_e |\sin(2\pi f_{lamp}(\tau - t_{\varnothing_e}))| + B_e d\pi$$ [Equation 2]

In Equation 2, t may denote an exposure start time, Δt may denote an exposure time period, and $B_e$ may denote an hourly average brightness of the light source.

In addition, Equation 2 may be rearranged to obtain Equation 3.

$$L_{measure}(t) = \\ B_e \Delta t + \frac{2A_e}{2\pi f_{lamp}} \{M_1(t; f_{lamp}, \Delta t, t_{\phi_e}) - M_0(t; f_{lamp}, t_{\phi_e})\} - \\ \frac{A_e}{2\pi f_{lamp}} \{\cos(2\pi f_{lamp}(t + \Delta t - t_{\phi_e}) - M_1(t)\pi) - \\ \cos(2\pi f_{lamp}(t - t_{\phi_e}) - M_0(t)\pi)\}$$ [Equation 3]

In Equation 3, $$M_1(t; f_{lamp}, \Delta t, t_{\phi_e}) \text{ equals } \left\lfloor \frac{2\pi f_{lamp}(t + \Delta t - t_{\phi_e})}{\pi} \right\rfloor,$$

$$M_0(t; f_{lamp}, t_{\phi_e}) \text{ equals } \left\lfloor \frac{2\pi f_{lamp}(t - t_{\phi_e})}{\pi} \right\rfloor,$$

and $\lfloor t \rfloor$ operation denotes a maximum integer value that is not greater than t.

In addition, for brevity of expression, when variable $$\frac{A_e}{2\pi f_{lamp}}$$

is replaced with variable $A_s$, Equation 3 may be given as Equation 4.

$$L_{measure}(t) = B_e \Delta t + 2A_e \{M_1(t; f_{lamp}, \Delta t, t_{\varnothing_e}) - M_0(t; f_{lamp}, t_{\varnothing_e})\} - A_e \{\cos(2\pi f_{lamp}(t + \Delta t - t_{\varnothing_e}) - M_1(t)\pi) - \cos(2\pi f_{lamp}(t - t_s) - M_0(t)\pi)\}$$ [Equation 4]

The flicker information determiner 120 may obtain $L_{measure}(t)$ through an imaging signal that corresponds to at least one frame, the imaging signal being obtained by the imaging device 110. In addition, the flicker information determiner 120 may obtain an exposure start time t and an exposure time period Δt that are set for the imaging device 110 to obtain the imaging signal that corresponds to the at least one frame. Accordingly, in Equation 3 or 4, the flicker information determiner 120 may obtain, by using the previously obtained variables t, Δt, and $L_{measure}$(t) information $A_e$ that corresponds to an amplitude of the light source, information $B_e$ that corresponds to average brightness of the light source, power frequency information $f_{lamp}$ of the light source, and information $t_{\varnothing_e}$ that corresponds to a phase of the light source, which may be determined as flicker information of the light source.

In addition, by taking into account a difference between exposure start times of lines of the imaging device 110, the flicker information determiner 120 may determine brightness $L_{measure}(t_f,l)$ of light exposed to the imaging device 110, by using Equation 5.

$$L_{measure}(t_f,l)=L_l*[B_e\Delta t+2A_e\{M_1(t_f+t_L*l;f_{lamp},\Delta t,t_{\varnothing_e})-M_0(t_f+t_2*l;f_{lamp},t_{\varnothing_e})\}]-A_e\{\cos(2\pi f_{lamp}(t_f+t_L*l+\Delta t-t_{\varnothing_e})-M_1(t_f+t_L*l;f_{lamp},\Delta t,t_{\varnothing_e})\pi)-\cos(2\pi f_{lamp}(t_f+t_L*l-t_{\varnothing_e})-M_0(t_f+t_L*l;f_{lamp},t_{\varnothing_e})\pi)\}] \qquad \text{[Equation 5]}$$

In Equation 5, $L_l$ denotes average brightness of a scene irrelevant to the light source regarding line l, and $t_f$ denotes an exposure start time of an $f^{th}$ frame or an exposure start time of an uppermost $0^{th}$ line (l=0) of the imaging device 110. Thus, an exposure start time of an $l^{th}$ line of the $f^{th}$ frame of the imaging device 110 may be $t_f+t_L*l$.

Accordingly, since the flicker information determiner 120 may obtain $L_{measure}(t_f,l)$, $t_f$, l, and Δt through an imaging signal that corresponds to at least one frame, the imaging signal being obtained by the imaging device 110, the flicker information determiner 120 may obtain, by using Equation 5, information $A_e$ that corresponds to the amplitude of the light source, information $B_e$ that corresponds to the average brightness of the light source, power frequency information $f_{lamp}$ of the light source, and information $t_{\varnothing_e}$ that corresponds to the phase of the light source, which may be determined as flicker information of the light source.

In addition, according to an embodiment, when an exposure time period is assumed to be about ¼ of a light source cycle, the flicker information determiner 120 may simply determine $L_{measure}(t)$, which is brightness of light exposed to the imaging device 110 at the time t, by using Equation 6.

$$L_{measure}(t)=A\cos(4\pi f_{lamp}(t-t_{\varnothing})) \qquad \text{[Equation 6]}$$

In Equation 6, A may denote amplitude information of the light source, $f_{lamp}$ may denote a power frequency of the light source, $t_{\varnothing}$ may denote a phase of the light source, and B may denote average brightness of the light source. The information $A_s$ that corresponds to the amplitude of the light source, the information $B_s$ that corresponds to the average brightness of the light source, and the information $t_{\varnothing_s}$ that corresponds to the phase of the light source that are used in Equations 1 to 5 may respectively correspond to amplitude information A of the light source, phase $t_{\varnothing}$ of the light source, and average brightness B of the light source as in the following example:

$$A=2*A_s*(\sin(\pi f_{lamp}\Delta t)-r_r), B=B_s*\Delta t+2*A_s*r_t,$$

$$t_{\varnothing}=t_{\varnothing_e}+1/(4*f_{lamp})-\Delta t/2 \text{ (where } r_t=\Delta t*2 f_{lamp}).$$

Accordingly, since the flicker information determiner 120 may obtain $L_{measure}(t)$, and Δt through an imaging signal that corresponds to at least one frame, the imaging signal being obtained by the imaging device 110, the flicker information determiner 120 may obtain, by using Equation 6, the amplitude information A of the light source, the average brightness information B of the light source, power frequency information $f_{lamp}$ of the light source, and the phase information $t_{\varnothing}$ of the light source, which may be determined as flicker information of the light source.

In addition, by taking into account a difference between exposure start times of lines of the imaging device 110, the flicker information determiner 120 may determine brightness $L_{measure}(t_f,l)$ of light exposed to the imaging device 110, by using Equation 7.

$$L_{measure}(t_f,l)=L_l*[A\cos(4\pi f_{lamp}(t_f+t_L*l-t_{\varnothing}))+B] \qquad \text{[Equation 7]}$$

In Equation 7, $L_l$ denotes average brightness of a scene irrelevant to the light source regarding line l, $t_f$ denotes an exposure start time of an $f^{th}$ frame or an exposure start time of an uppermost $0^{th}$ line (l=0) of the imaging device 110, and $t_L$ denotes a time difference between exposure start times of lines of the imaging device 110. Thus, an exposure start time of an $l^{th}$ line of the $f^{th}$ frame of the imaging device 110 may be $t_f+t_L*l$.

Accordingly, since the flicker information determiner 120 may obtain $L_{measure}(t_f,l)$, $t_f$, l, and Δt through an imaging signal that corresponds to at least one frame, the imaging signal being obtained by the imaging device 110, the flicker information determiner 120 may obtain, by using Equation 7, amplitude information A of the light source, average brightness information B of the light source, power frequency information $f_{lamp}$ of the light source, and phase information $t_{\varnothing}$ of the light source, which may be determined as flicker information of the light source.

In detail, the flicker information determiner 120 may determine flicker information of the light source by using more than three items of sample data $(t_i, L_{li}(t_i))$ with respect to each line of at least one frame obtained by the imaging device 110 and Equation 8.

$$\begin{bmatrix} \vdots \\ L_{li}(t_i) \\ \vdots \end{bmatrix} = \begin{bmatrix} \vdots & \vdots & \vdots \\ \cos(4\pi f_{lamp} t_i) & \sin(4\pi f_{lamp} t_i) & 1 \\ \vdots & \vdots & \vdots \end{bmatrix} \begin{bmatrix} L_l * A\cos(4\pi f_{lamp} t_{\varnothing}) \\ L_l * A\sin(4\pi f_{lamp} t_{\varnothing}) \\ L_l * B \end{bmatrix} \qquad \text{[Equation 8]}$$

In Equation 8, $L_{li}(t_i)$ data that is obtained at a time $t_i$ at an $l^{th}$ sensor line, and the time $t_i$ denotes a time at which sample data is actually obtained as in $t_i=t_f+t_L$.

When a pseudo inverse is used in Equation 8, the flicker information determiner 120 may determine data that corresponds to $[L_l*A\cos(4\pi f_{lamp} t_{\varnothing}), L_l*A\sin(4\pi f_{lamp} t_{\varnothing}), L_l*B]^T$, by using Equation 9.

$$\begin{bmatrix} L_l * A\cos(4\pi f_{lamp} t_{\varnothing}) \\ L_l * A\sin(4\pi f_{lamp} t_{\varnothing}) \\ L_l * B \end{bmatrix} = \begin{bmatrix} \vdots & \vdots & \vdots \\ \cos(4\pi f_{lamp} t_i) & \sin(4\pi f_{lamp} t_i) & 1 \\ \vdots & \vdots & \vdots \end{bmatrix}^+ \begin{bmatrix} \vdots \\ L_{li}(t_i) \\ \vdots \end{bmatrix} \qquad \text{[Equation 9]}$$

In addition, the flicker information determiner 120 may determine $L_l*A$ and $t_{\varnothing}$, which are pieces of flicker information of the light source, by using Equation 10.

$$L_l * A = \sqrt{(A\cos(4\pi f_{lamp} t_\emptyset))^2 + (A\sin(4\pi f_{lamp} t_\emptyset))^2}$$

$$t_\emptyset = a\tan 2(A\sin(4\pi f_{lamp} t_\emptyset), A\cos(4\pi f_{lamp} t_\emptyset)) \quad \text{[Equation 10]}$$

When $L_l * B$ that may be scene information that is not affected by the light source is referred to as $L_{Bl}$, the flicker information determiner 120 may determine A', $t_\emptyset$, and B', which are pieces of flicker information of the light source independent of scene information, by using Equations 11 to 14.

$$\frac{L_{li}(t_i)}{L_{Bl}} = A'\cos(4\pi f_{lamp}(t_i - t_\phi)) + B' \quad \text{[Equation 11]}$$

$$\begin{bmatrix} \vdots \\ \frac{L_{li}(t_i)}{L_{Bl}} \\ \vdots \end{bmatrix} = \begin{bmatrix} \vdots & \vdots & \vdots \\ \cos(4\pi f_{lamp} t_i) & \sin(4\pi f_{lamp} t_i) & 1 \\ \vdots & \vdots & \vdots \end{bmatrix} \begin{bmatrix} A'\cos(4\pi f_{lamp} t_\phi) \\ A'\sin(4\pi f_{lamp} t_\phi) \\ B' \end{bmatrix} \quad \text{[Equation 12]}$$

$$\begin{bmatrix} A'\cos(4\pi f_{lamp} t_\phi) \\ A'\sin(4\pi f_{lamp} t_\phi) \\ B' \end{bmatrix} = \begin{bmatrix} \vdots & \vdots & \vdots \\ \cos(4\pi f_{lamp} t_i) & \sin(4\pi f_{lamp} t_i) & 1 \\ \vdots & \vdots & \vdots \end{bmatrix}^\dagger \begin{bmatrix} \vdots \\ L_{li}(t_i) \\ \vdots \end{bmatrix} \quad \text{[Equation 13]}$$

$$A' = \sqrt{(A'\cos(4\pi f_{lamp} t_\phi))^2 + (A'\sin(4\pi f_{lamp} t_\phi))^2} \quad \text{[Equation 14]}$$

$$t_\phi = a\tan 2(A'\sin(4\pi f_{lamp} t_\phi), A'\cos(4\pi f_{lamp} t_\phi))$$

In Equations 11 to 14, A'=A/B and B'=B/B≈1.

In addition, with regard to Equation 5, the flicker information determiner 120 may determine flicker information of the light source independent of scene information, by using Equation 15.

$$\frac{L_{li}(t_i)}{L_{Bl}} = \quad \text{[Equation 15]}$$
$$B'\Delta t + 2A'\{M_1(t_i; f_{lamp}, \Delta t, t_\phi) - M_0(t_i; f_{lamp}, t_\phi)\} -$$
$$A'\{\cos(2\pi f_{lamp}(t_i + \Delta t - t_\phi) - M_1(t_i; f_{lamp}, \Delta t, t_\phi)\pi) -$$
$$\cos(2\pi f_{lamp}(t_i - t_\phi) - M_0(t_i; f_{lamp}, t_\phi)\pi)\}$$

Next, by using the obtained pieces of flicker information A', $t_\emptyset$, and B', the flicker information determiner 120 may determine $f_{lamp}$, which is another piece of flicker information, through Equation 16.

$$\bar{y}_i = \cos(4\pi f_{lamp} \bar{t}_i) \quad \text{[Equation 16]}$$

In Equation 16, $\bar{t}_i = t_i - t_\emptyset = t_f + t_L * 1 - t_\emptyset$, and $$\bar{y}_i = \left(\frac{L_{li}(t_i)}{L_{Bi}} - B'\right) / A'.$$

That is, by using previously obtained data $(\bar{t}_i, \bar{y}_i)$, the flicker information determiner 120 may obtain $f_{lamp}$ through an iterative approach. In detail, the flicker information determiner 120 may determine $f_{lamp}$ through Equation 18 by using an objective function as shown in Equation 17.

$$\min_{\Delta f} \frac{1}{2} \sum_i \{\bar{y}_i - \cos(4\pi (f_{lamp} + \Delta f)\bar{t}_i)\}^2 \quad \text{[Equation 17]}$$

$$f_{lamp} \leftarrow f_{lamp} + \Delta f \quad \text{[Equation 18]}$$
$$E_i = \cos(4\pi(f_{lamp} + \Delta f)\bar{t}_i) - \bar{y}_i$$
$$J_i = \frac{\partial E_i}{\partial \Delta f} = -\sin(4\pi f_{lamp} \bar{t}_i) * 4\pi \bar{t}_i$$
$$H = \sum_i J_i^T J_i$$
$$\Delta f = -H^{-1} \sum_i J_i^T E_i$$

In addition, according to an embodiment, the flicker information determiner 120 may determine (A', B', $f_{lamp}$, $t_\emptyset$), which is flicker information of the light source, by using Equation 19.

$$\bar{y}_i = A'*\cos(4\pi f_{lamp} E_i) \quad \text{[Equation 19]}$$

In Equation 19, $E_i = t_i - t_\emptyset = t_f + t_L * 1 - t_\emptyset$, and $$\bar{y}_i = \left(\frac{L_{li}(t_i)}{L_{Bl}} - B'\right).$$

That is, by using previously obtained data $(\bar{t}_i, \bar{y}_i)$, the flicker information determiner 120 may determine $s = [A', B', t_\emptyset, f_{lamp}]^T$ through an iterative approach. In detail, the flicker information determiner 120 may determine $s = [A', B', t_\emptyset, f_{lamp}]^T$ through Equation 21 by using an objective function as shown in Equation 20.

$$\min_{\Delta s} \frac{1}{2} \sum_i \left\{\left(\frac{L_{li}(t_i)}{L_{Bl}} - (B' + \Delta B')\right) - \quad \text{[Equation 20]}\right.$$
$$\left. (A' + \Delta A') * \cos(4\pi (f_{lamp} + \Delta f)\bar{t}_i)\right\}^2$$

$$s \leftarrow s + \Delta s \quad \text{[Equation 21]}$$
$$\bar{E}_i = A' * \cos(4\pi f_{lamp} \bar{t}_i) - \bar{y}_i$$
$$\bar{J}_i = \frac{\partial E_i}{\partial \Delta s} = \left[\frac{\partial E_i}{\partial \Delta A'}, \frac{\partial E_i}{\partial \Delta B'}, \frac{\partial E_i}{\partial \Delta t_\phi}, \frac{\partial E_i}{\partial \Delta f_{lamp}}\right]$$
$$\frac{\partial E_i}{\partial \Delta A'} = \cos(4\pi f_{lamp} \bar{t}_i)$$
$$\frac{\partial E_i}{\partial \Delta B'} = 1$$
$$\frac{\partial E_i}{\partial \Delta t_\phi} = 4\pi f_{lamp} * A' * \sin(4\pi f_{lamp} \bar{t}_i)$$
$$\frac{\partial E_i}{\partial \Delta f_{lamp}} = -4\pi \bar{t}_i * A' * \sin(4\pi f_{lamp} \bar{t}_i)$$
$$\bar{H} = \sum_i \bar{J}_i^T \bar{J}_i$$
$$\Delta s = -\bar{H}^{-1} \sum_i \bar{J}_i^T \bar{E}_i$$

In addition, based on a previously set exposure condition, the imaging device 110 may periodically obtain an imaging signal that corresponds to at least one frame, according to a previously set time interval, and the flicker information determiner 120 may periodically update previously determined flicker information of the light source by using the imaging signal that is obtained according to the previously set time interval.

Based on flicker information of the light source that is determined by the flicker information determiner 120, the imaging device controller 130 may control an exposure start time of the imaging device 110 in order to avoid and/or reduce flicker occurrence due to the light source. That is, the imaging device controller 130 may determine an exposure start time for avoiding and/or reducing flicker occurrence due to the light source and may control the imaging device 110 with the determined exposure start time. In addition, according to an embodiment, by analyzing flicker information of the light source, the imaging device controller 130 may determine an exposure start time for avoiding and/or reducing flicker occurrence, with respect to an exposure time period that is determined by a user or auto exposure algorithm, and may control the imaging device 110 with the determined exposure start time.

According to an embodiment, the imaging device controller 130 may determine an exposure start time of the imaging device 110, based on Equation 22.

$$\text{Exposure Start Time} = t_\phi + \frac{(\Delta t - \Delta t_s)}{2} \qquad \text{[Equation 22]}$$

In Equation 22, $t_\varnothing$ denotes phase information of the light source from among the flicker information, $\Delta t$ denotes an exposure time period used to determine the flicker information, and $\Delta t_s$ denotes an exposure time period set for image capturing. In addition, the exposure start time defined in Equation 22 may be set based on an exposure start time of a first line of a first frame of a previously obtained at least one frame. Accordingly, when a user intends to capture a still image within an exposure time period $\Delta t_s$, the flicker information determiner 120 may determine flicker information, based on an imaging signal obtained in liveview, and the imaging device controller 130 may control an exposure start time of the imaging device 110 for avoiding and/or reducing flicker occurrence due to the light source, by using the determined flicker information and Equation 22. In addition, an exposure start time determined by the imaging device controller 130 may be a time at which the imaging device 110 is most brightly exposed to light by the light source. In detail, the exposure start time determined by the imaging device controller 130 may be a time at which the first line of the imaging device 110 is most brightly exposed to light.

In addition, according to another embodiment, when the flicker information determiner 120 obtains flicker information of the light source, based on Equation 6, the imaging device controller 130 may determine an exposure start time of the imaging device 110, based on Equation 23.

$$\text{Exposure Start Time} = t_\phi + \frac{(\Delta t - \Delta t_s)}{2} - \frac{t_L * l_c}{2} + \frac{N}{2f_{lamp}} \qquad \text{[Equation 23]}$$

In Equation 23, $t_\varnothing$ denotes phase information of the light source from among the flicker information, $\Delta t$ denotes an exposure time period used to determine the flicker information, $\Delta t_s$ denotes an exposure time period set for image capturing, $l_c$ denotes a line position for image capturing in the brightest lighting condition from among line positions of the imaging device 110, $t_L$ denotes a time difference between exposure start times of lines of the imaging device 110, $f_{lamp}$ denotes power frequency information of the light source from among the flicker information, and N denotes an integer. In addition, the exposure start time defined in Equation 23 may be set based on an exposure start time of a first line of a first frame of a previously obtained at least one frame. Accordingly, when a user intends to capture a still image within an exposure time period $\Delta t_s$, the flicker information determiner 120 may determine flicker information, based on an imaging signal obtained in liveview, and the imaging device controller 130 may control an exposure start time of the imaging device 110 for avoiding and/or reducing flicker occurrence due to the light source, by using the determined flicker information and Equation 23. In addition, an exposure start time determined by the imaging device controller 130 may be a time at which the imaging device 110 is most brightly exposed to light by the light source. In detail, due to $$\frac{t_L * l_c}{2},$$

which is an added portion with respect to Equation 22, the exposure start time determined by the imaging device controller 130 may be a time at which a line corresponding to the middle of the imaging device 110 is most brightly exposed to light. In addition, by adjusting $$\frac{t_L * l_c}{2},$$

the imaging device controller 130 may control a time at which a previously set line of the imaging device 110 is most brightly exposed to light. In addition, due to $$\frac{N}{2f_{lamp}},$$

which is an added portion with respect to Equation 22, the imaging device controller 130 may determine exposure start times for capturing a plurality of still images as periodical times at which the imaging device 110 is most brightly exposed to light by the light source.

According to another embodiment, when the flicker information determiner 120 determines flicker information of the light source, based on Equation 3, the imaging device controller 130 may determine an exposure start time of the imaging device 110, based on Equation 24.

$$\text{Exposure Start Time} = \qquad \text{[Equation 24]}$$
$$t_{\phi_e} + \frac{1}{4f_{lamp}} + \frac{(\Delta t - \Delta t_s)}{2} - \frac{t_L * l_c}{2} + \frac{N}{2f_{lamp}}$$

In Equation 24, $t_{\varnothing_s}$ denotes power phase information of the light source from among the flicker information, $\Delta t$ denotes an exposure time period used to determine the flicker information, $\Delta t_s$ denotes an exposure time period set for image capturing, $l_e$ denotes a line position for image capturing in the brightest lighting condition from among line positions of the imaging device 110, $t_L$ denotes a time difference between exposure start times of lines of the imaging device 110, $f_{lamp}$ denotes power frequency information of the light source from among the flicker information, and N denotes an integer. In addition, the exposure start time defined in Equation 24 may be set based on an exposure start time of a first line of a first frame of a previously obtained at least one frame.

Figure 4A:
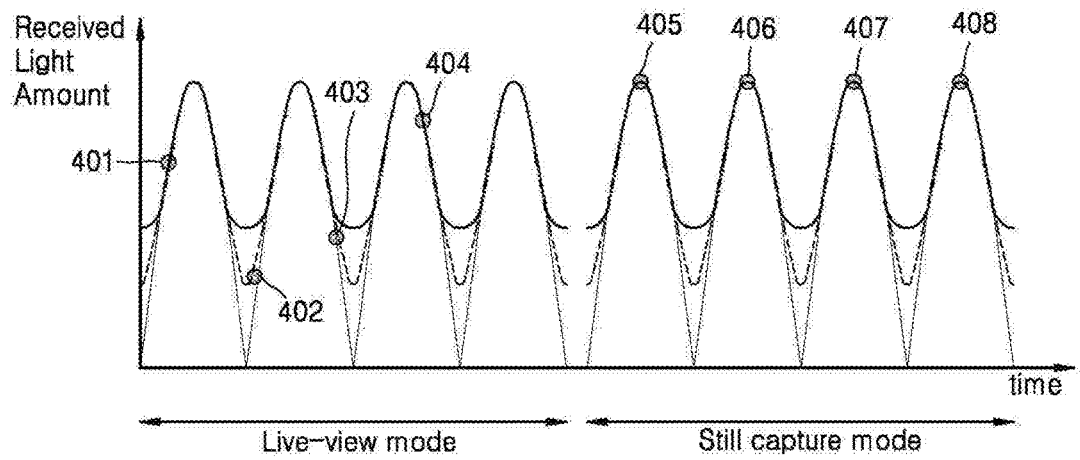
FIG. 4A is a diagram illustrating an example in which an imaging device controller controls an exposure start time of an imaging device.

FIG. 4A is a diagram illustrating an example in which the imaging device controller 130 controls an exposure start time of the imaging device 110.

The imaging device 110 may obtain an imaging signal that corresponds to at least one frame, based on exposure start times 401, 402, 403, and 404, which are previously set exposure conditions. Next, based on the obtained imaging signal, the flicker information determiner 120 may determine flicker information of a light source.

Accordingly, based on the flicker information of the light source, the imaging device controller 130 may control exposure start times 405, 406, 407, and 408 in order to avoid and/or reduce flicker occurrence due to the light source. That is, the exposure start times 405, 406, 407, and 408 controlled by the imaging device controller 130 may be times at which the imaging device 110 is most brightly exposed to light by the light source.

In addition, based on the flicker information of the light source that is determined by the flicker information determiner 120, the imaging device controller 130 may determine whether flicker due to the light source has occurred or not. According to an embodiment, based on amplitude information of the light source and average brightness information of the light source from among the flicker information of the light source, the imaging device controller 130 may determine whether flicker due to the light source has occurred or not. For example, through comparison between a ratio of amplitude information A of the light source and average brightness information B of the light source that are disclosed in Equation 6 and a predetermined value, the imaging device controller 130 may determine whether flicker due to the light source has occurred or not. When it is determined that flicker due to the light source occurs, the imaging device controller 130 may control an exposure start time of the imaging device 110 in order to avoid and/or reduce flicker occurrence due to the light source. When it is determined that flicker due to the light source does not occur, the imaging device controller 130 may control the imaging device 110 according to a previously set method without separately determining an exposure time of the imaging device 110 for avoiding and/or reducing flicker occurrence, thereby allowing image capturing to proceed.

Based on the exposure start time controlled by the imaging device controller 130, the imaging device 110 may obtain an imaging signal that corresponds to a still image or video image. Next, by using an imaging signal that corresponds to a still image or video image that is captured just previously, the flicker information determiner 120 may determine flicker information of the light source and may update existing flicker information of the light source. Next, based on the updated flicker information, the imaging device controller 130 may control the exposure start time of the imaging device 110. Accordingly, whenever the image capturing apparatus 100 captures a still image or video image, the flicker information determiner 120 may update flicker information of the light source, and the imaging device controller 130 may control, based on the updated flicker information, an exposure start time of the imaging device 110 in order to avoid and/or reduce flicker occurrence of the light source that is changeable.

According to an embodiment, the imaging device 110 may obtain, based on an exposure condition that is controlled with respect to the entire region of the imaging device 110, an imaging signal that corresponds to the entire region of at least one frame, and the flicker information determiner 120 may determine, based on the obtained imaging signal that corresponds to the entire region of the at least one frame, flicker information of the light source. Next, the imaging device controller 130 may control, based on the determined flicker information of the light source, the imaging device 110 in order to avoid and/or reduce flicker occurrence. In addition, according to another embodiment, the imaging device 110 may obtain, based on an exposure condition that is controlled with respect to a partial region of the imaging device 110, an imaging signal that corresponds to a partial region of at least one frame, and the flicker information determiner 120 may determine, based on the obtained imaging signal that corresponds to the partial region of the at least one frame, flicker information of the light source. Next, the imaging device controller 130 may control, based on the determined flicker information of the light source, the imaging device 110 to avoid and/or reduce flicker in another partial region of the at least one frame. For example, when the image capturing apparatus 100 captures a video image, the imaging device controller 130 may apply an exposure condition for occurrence of flicker only to a partial region, for example, the top or bottom, of the imaging device 110, and the imaging device controller 130 may control the imaging device 110 to avoid and/or reduce flicker with respect to the other region of the imaging device 110. As a result, the image capturing apparatus 100 may capture and store a video image in which flicker is avoided and/or reduced with respect to the other region of the imaging device 110.

Figure 4B:
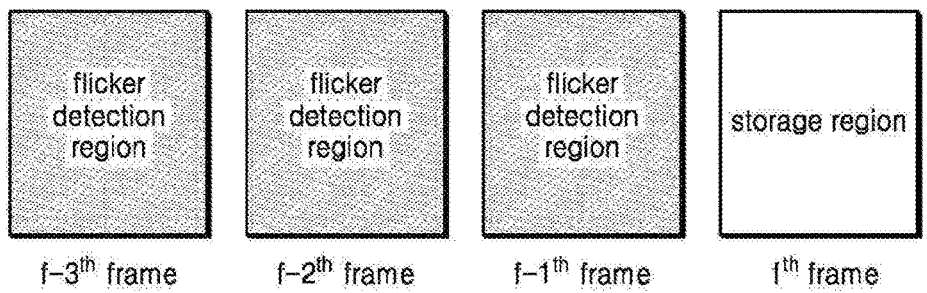
FIG. 4B is a diagram illustrating an example of determining flicker information of a light source based on the entire region of at least one frame in which flicker has occurred.

FIG. 4B is a diagram illustrating an example of determining flicker information of a light source based on an entire region of at least one frame in which flicker has occurred.

The imaging device controller 130 may control the imaging device 110 so that flicker may occur in the entire region of an f−3th frame, an f−2th frame, and an f−1th frame (for example, a flicker detection region of FIG. 4B), and the flicker information determiner 120 may determine, based on the entire region of the f−3th frame, the f−2th frame, and the f−1th frame, flicker information of the light source. Next, the imaging device controller 130 may control, based on the determined flicker information of the light source, the imaging device 110 in order to avoid and/or reduce flicker occurrence due to the light source, and as a result, the imaging device 110 may obtain an $f^{th}$ frame in which flicker occurrence is avoided and/or reduced. Accordingly, the image capturing apparatus 100 may store the $f^{th}$ frame in which the flicker occurrence is avoided and/or reduced. In addition, next, the image capturing apparatus 100 may determine flicker information of the light source by using the f−3th to $f^{th}$ frames and may store an f+1th frame in which flicker occurrence is avoided and/or reduced.

Figure 4C:
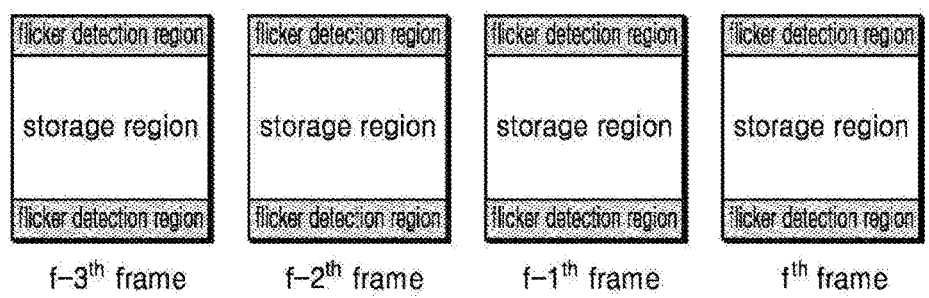
FIG. 4C is a diagram illustrating an example of determining flicker information of a light source based on a partial region of at least one frame in which flicker has occurred.

FIG. 4C is a diagram illustrating an example of determining flicker information of a light source based on a partial region of at least one frame in which flicker has occurred.

The imaging device controller 130 may control the imaging device 110 so that flicker may occur in a partial region of each of an $f-3^{th}$ frame, an $f-2^{th}$ frame, and an $f-1^{th}$ frame (for example, a flicker detection region of FIG. 4C), and the flicker information determiner 120 may determine, based on the partial region of each of the frames, flicker information of the light source. Next, the imaging device controller 130 may control, based on the determined flicker information of the light source, the imaging device 110 to avoid and/or reduce flicker occurrence in the other partial region (for example, a storage region of FIG. 4C) of each of the frames, and as a result, the image capturing apparatus 100 may store the other partial region of each of the frames in which flicker occurrence is avoided and/or reduced.

In addition, according to another embodiment, whenever the image capturing apparatus 100 captures a still image or video image, the imaging device controller 130 may control, based on a position of the brightest line of lighting, detected in a still image or video image that is captured just previously, an exposure start time of the imaging device 110. According to an embodiment, the position of the brightest line of lighting may be determined by comparing an average image in which motions between images are compensated for with an image that is captured just previously, comparing an image that is predicted through flicker information with an actually captured image, or the like. That is, without an update to flicker information based on the still image or video image that is captured just previously, the imaging device controller 130 may control, based on the position of the brightest line of lighting, detected in the still image or video image that is captured just previously, the exposure start time of the imaging device 110. For example, the imaging device controller 130 may control, based on Equation 25, the exposure start time of the imaging device 110.

$$\text{Exposure Start Time} = t_\phi - \frac{t_L * \Delta l}{2} + \frac{N}{2f_{lamp}} \quad \text{[Equation 25]}$$

In Equation 25, $\Delta l$ denotes a difference between a position of the brightest line of lighting detected in a still image or video image captured just previously and a position of the center line, $t_\phi$ denotes phase information of the light source from among flicker information, $\Delta t$ denotes an exposure time period used to obtain the flicker information, $t_L$ denotes a time difference between exposure start times of lines of the imaging device 110, $f_{lamp}$ denotes power frequency information of the light source from among the flicker information, and N denotes an integer.

According to an embodiment, the imaging device controller 130 may control, based on the flicker information of the light source that is obtained by the flicker information determiner 120, an exposure time period with respect to each line of the imaging device 110 in order to avoid and/or reduce flicker occurrence due to the light source.

According to an embodiment, the flicker information determiner 120 may determine a degree of change in brightness of each line of the imaging device 110 during a process of determining flicker information of the light source, based on an imaging signal that corresponds to at least one frame, the imaging signal being previously obtained in liveview. Accordingly, the imaging device controller 130 may determine an exposure time period of each line of the imaging device 110, which may compensate for the degree of change in brightness of each line of the imaging device 110, and may control the imaging device 110 with respect to the determined exposure time period of each line. For example, the imaging device controller 130 may determine brightness information $L'_l$ of the light source at line l of the imaging device 110 by using the flicker information of the light source that is obtained by the flicker information determiner 120. In this regard, it is assumed that the maximum value of $L'_l$ is normalized as 1. Next, the imaging device controller 130 may determine, by using an existing exposure time period $T'_{exp,l}$ of each line, an exposure time period $T_{exp,}$ $_l=T'_{exp,l}/L'_l$ of each line that may compensate a change in brightness of each line of the imaging device 110.

Accordingly, the imaging device controller 130 may control the imaging device 110 with respect to the determined exposure time period of each line, and the imaging device 110 may obtain an imaging signal that corresponds to a frame of uniform brightness.

According to an embodiment, the imaging device controller 130 may determine, based on the flicker information of the light source that is obtained by the flicker information determiner 120, a compensation gain value of each line of the imaging device 110 and may apply the determined compensation gain value to at least one frame that is previously obtained.

According to an embodiment, the flicker information determiner 120 may determine a degree of change in brightness of each line of the imaging device 110 during a process of determining flicker information of the light source, based on a previously obtained imaging signal that corresponds to at least one frame. Accordingly, the imaging device controller 130 may determine a compensation gain value of each line that may compensate for the degree of change in brightness of each line of the imaging device 110, and may apply the determined compensation gain value of each line to at least one frame that is previously obtained. For example, the imaging device controller 130 may determine brightness information $L'_l$ of the light source at line l of the imaging device 110 by using the flicker information of the light source that is obtained by the flicker information determiner 120. In this regard, it is assumed that the maximum value of $L'_l$ is normalized as 1. Next, the imaging device controller 130 may obtain, by applying a compensation gain value $1/L'_l$ to existing data $D_{lk}$ denoting brightness of each line, data $D'_{lk}=D_{lk}/L'_l$ having the compensated brightness.

Accordingly, by applying the determined compensation gain value to the at least one frame that is previously obtained, the imaging device controller 130 may remove flicker from the at least one frame previously obtained.

Figure 5:
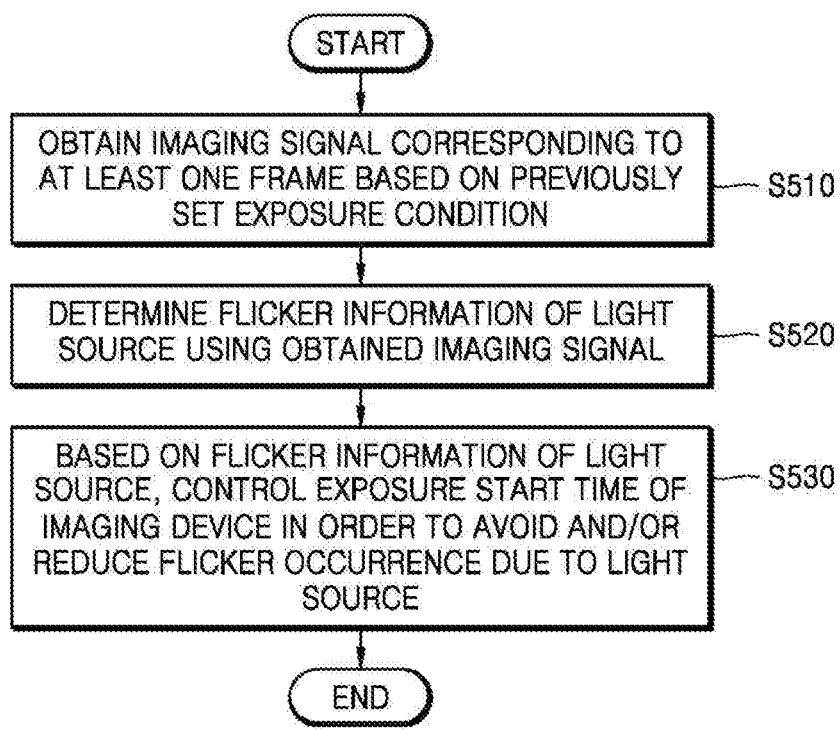
FIG. 5 is a flowchart illustrating an example method of operating an image capturing apparatus, according to an example embodiment.

FIG. 5 is a flowchart illustrating an example method of operating the image capturing apparatus 100, according to an example embodiment. The method of FIG. 5 may be performed by the image capturing apparatus 100 of FIG. 1, and repeated descriptions thereof will be omitted.

In operation S510, the image capturing apparatus 100 may obtain, based on a previously set exposure condition, an imaging signal that corresponds to at least one frame. According to an embodiment, the previously set condition may be an exposure condition for occurrence of flicker with respect to a light source. In detail, the image capturing apparatus 100 may determine an exposure start time and an exposure time period, which are conditions for forcing the occurrence of flicker with respect to the light source, and based on the determined exposure start time and exposure time period, the image capturing apparatus 100 may obtain the imaging signal that corresponds to the at least one frame.

In addition, the image capturing apparatus 100 may obtain an imaging signal that corresponds to at least one frame, according to an exposure condition for occurrence of flicker with respect to a light source, in a liveview mode. According to an embodiment, in a state where a liveview FPS rate is constant, the image capturing apparatus 100 may obtain an imaging signal that corresponds to at least one frame, according to an exposure condition for occurrence of flicker with respect to a light source. In addition, according to another embodiment, in a state where the liveview FPS rate has changed, the image capturing apparatus 100 may obtain an imaging signal that corresponds to at least one frame, according to an exposure condition for occurrence of flicker with respect to a light source.

In addition, according to an embodiment, when an exposure time period set by a user is less than a predetermined value, the image capturing apparatus 100 may obtain an imaging signal that corresponds to at least one frame, based on the previously set exposure condition. For example, when an exposure time period that is set by a user is less than a predetermined value, flicker is highly likely to occur, and thus, the image capturing apparatus 100 may obtain, based on an exposure condition for forcing flicker occurrence, an imaging signal that corresponds to at least one frame.

In operation S520, the image capturing apparatus 100 may determine flicker information of the light source using the imaging signal obtained in operation S510.

According to an embodiment, by using the imaging signal that corresponds to the at least one frame, the image capturing apparatus 100 may determine power frequency information of the light source, phase information of the light source, amplitude information of the light source, and average brightness information of the light source regarding a scene that is not affected by the light source, which are pieces of flicker information of the light source.

In addition, according to a previously set time interval, based on a previously set exposure condition, the image capturing apparatus 100 may periodically obtain an imaging signal that corresponds to at least one frame, and the image capturing apparatus 100 may periodically update previously determined flicker information of the light source by using the imaging signal obtained according to the previously set time interval.

In operation S530, based on the flicker information of the light source that is determined in operation S520, the image capturing apparatus 100 may control an exposure start time of an imaging device in order to avoid and/or reduce flicker occurrence due to the light source. That is, the image capturing apparatus 100 may determine an exposure start time for avoiding and/or reducing flicker occurrence due to the light source and may control the imaging device with the determined exposure start time. According to an embodiment, the exposure start time of the imaging device may be a time at which a first line of the imaging device is most brightly exposed to light. According to another embodiment, the exposure start time of the imaging device may be a time at which a line that corresponds to the middle of the imaging device is most brightly exposed to light. In addition, the exposure start time of the imaging device for capturing a plurality of still images may be periodical times at which the imaging device is most brightly exposed to light due to the light source.

In addition, according to an embodiment, based on the flicker information of the light source that is determined in operation S520, the image capturing apparatus 100 may control an exposure time period with respect to each line of the imaging device in order to avoid and/or reduce flicker occurrence due to the light source. According to an embodiment, the image capturing apparatus 100 may determine a degree of change in brightness of each line of the imaging device during a process of determining flicker information of the light source, based on an imaging signal that corresponds to at least one frame, the imaging signal previously obtained in liveview. The image capturing apparatus 100 may determine an exposure time period of each line of the imaging device, which may compensate the degree of change in brightness of each line of the imaging device, and may control the imaging device with the determined exposure time period of each line. Accordingly, the image capturing apparatus 100 may control the imaging device with the determined exposure time period of each line, and the imaging device may obtain an imaging signal that corresponds to a frame of uniform brightness.

In addition, according to another embodiment, based on the flicker information of the light source that is determined in operation S520, the image capturing apparatus 100 may determine a compensation gain value with respect to each line of the imaging device and may apply the determined compensation gain value to at least one frame that is previously obtained. According to an embodiment, the image capturing apparatus 100 may determine a degree of change in brightness of each line of the imaging device during a process of determining flicker information of the light source, based on a previously obtained imaging signal that corresponds to at least one frame. Next, the image capturing apparatus 100 may determine a compensation gain value of each line that may compensate the degree of change in brightness of each line of the imaging device 110, and may apply the determined compensation gain value of each line to the previously obtained imaging signal that corresponds to the at least one frame. Accordingly, by applying a determined compensation gain value to at least one frame that is previously obtained, the image capturing apparatus 100 may remove flicker of the at least one frame previously obtained.

Figure 6:
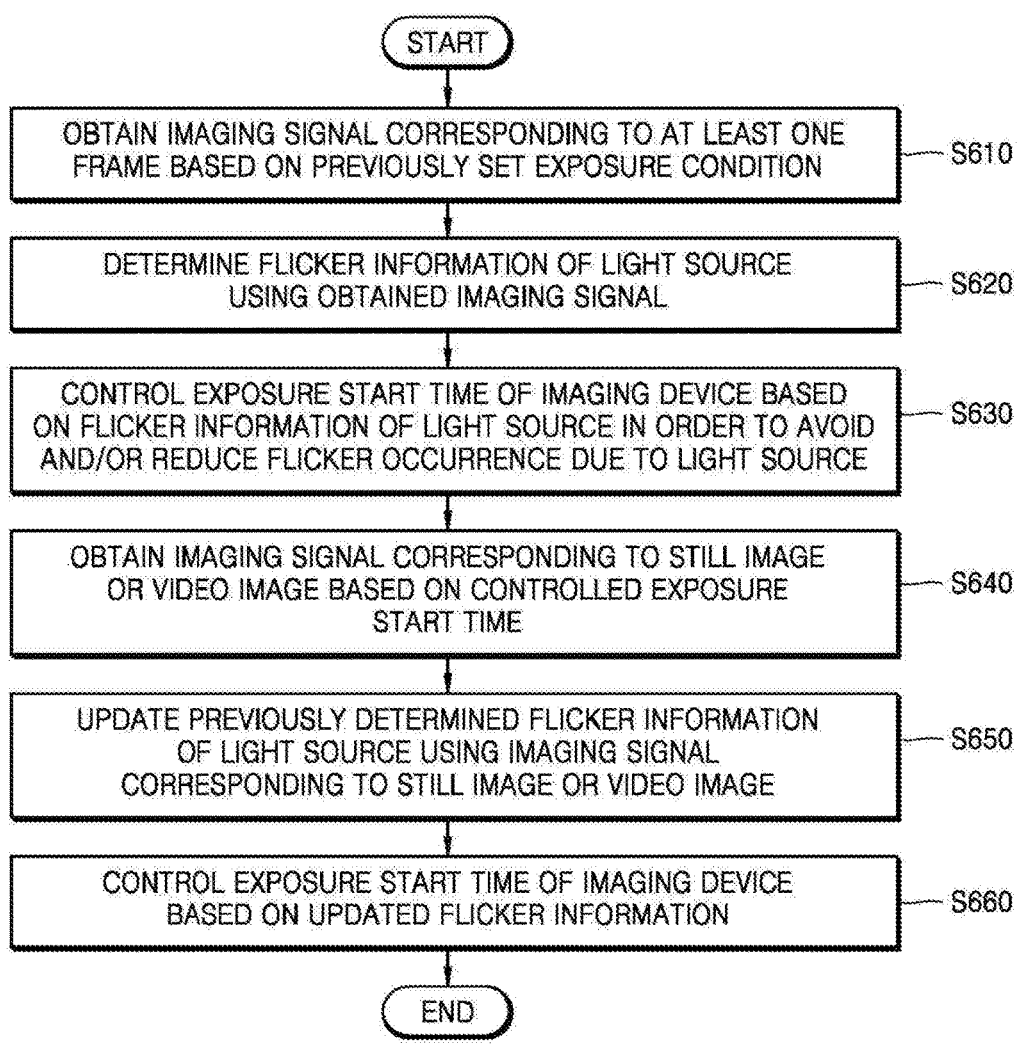
FIG. 6 is a flowchart illustrating an example method of operating an image capturing apparatus, according to an example embodiment.

FIG. 6 is a flowchart illustrating an example embodiment of the method of operating the image capturing apparatus 100.

The method of FIG. 6 may be performed by the image capturing apparatus 100 of FIG. 1, and repeated descriptions thereof will be omitted.

In operation S610, the image capturing apparatus 100 may obtain, based on a previously set exposure condition, an imaging signal that corresponds to at least one frame. The operation S610 may correspond to the operation S510 of FIG. 5, and thus, repeated descriptions thereof will be omitted.

In operation S620, the image capturing apparatus 100 may determine flicker information of a light source by using the imaging signal obtained in operation S610. The operation S620 may correspond to the operation S520 of FIG. 5, and thus, repeated descriptions thereof will be omitted.

In operation S630, the image capturing apparatus 100 may control, based on the flicker information of the light source that is determined in operation S620, an exposure start time of an imaging device in order to avoid and/or reduce flicker occurrence due to the light source. The operation S630 may correspond to the operation S530 of FIG. 5, and thus, repeated descriptions thereof will be omitted.

In operation S640, the image capturing apparatus 100 may obtain, based on the exposure start time controlled in operation S630, an imaging signal that corresponds to a still image or video image.

In operation S650, the image capturing apparatus 100 may update previously determined flicker information of the light source by using the imaging signal obtained in operation S640. That is, by using the imaging signal obtained in operation S640, the image capturing apparatus 100 may determine new flicker information of the light source and may update the existing flicker information of the light source to the new flicker information of the light source.

In operation S660, the image capturing apparatus 100 may control, based on the flicker information of the light source that is updated in operation S650, an exposure start time of the imaging device. Accordingly, whenever a still image or video image is captured, the image capturing apparatus 100 may update flicker information of the light source and thus may control the exposure start time of the imaging device in order to avoid and/or reduce flicker occurrence of the light source that is changeable.

In addition, according to an embodiment, the image capturing apparatus 100 may control, based on the flicker information of the light source that is updated in operation S650, an exposure time period with respect to each line of the imaging device.

In addition, according to another embodiment, the image capturing apparatus 100 may determine, based on the flicker information of the light source that is updated in operation S650, a compensation gain value with respect to each line of the imaging device and may apply the determined compensation gain value to an imaging signal that corresponds to a previously obtained still image or video image.

Figure 7:
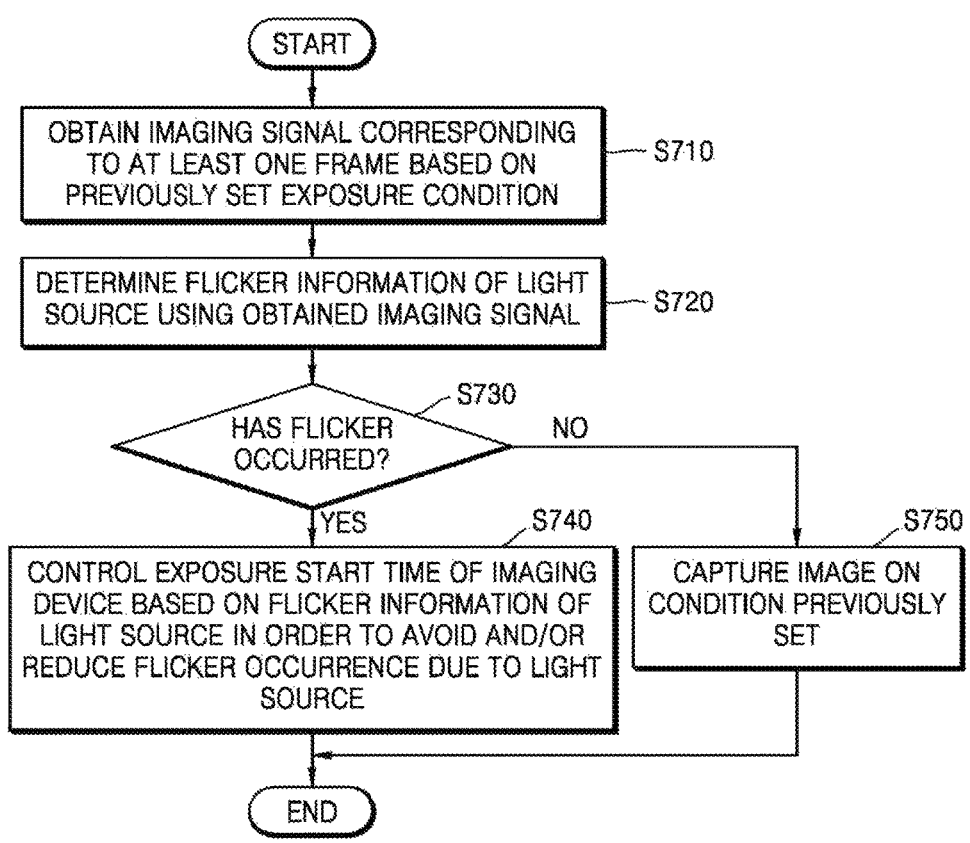
FIG. 7 is a flowchart illustrating an example method of operating an image capturing apparatus, according to an example embodiment.

FIG. 7 is a flowchart illustrating an example method of operating the image capturing apparatus 100.

The method of FIG. 7 may be performed by the image capturing apparatus 100 of FIG. 1, and repeated descriptions thereof will be omitted.

In operation S710, the image capturing apparatus 100 may obtain, based on a previously set exposure condition, an imaging signal that corresponds to at least one frame. The operation S710 may correspond to the operation S510 of FIG. 5, and thus, repeated descriptions thereof will be omitted.

In operation S720, the image capturing apparatus 100 may determine flicker information of a light source by using the imaging signal obtained in operation S710. The operation S720 may correspond to the operation S520 of FIG. 5, and thus, repeated descriptions thereof will be omitted.

In operation S730, the image capturing apparatus 100 may determine, based on the flicker information of the light source that is determined in operation S720, whether flicker due to the light source has occurred. According to an embodiment, the image capturing apparatus 100 may determine, based on amplitude information of the light source and average brightness information of the light source from among pieces of flicker information of the light source, whether flicker due to the light source has occurred.

When it is determined in operation S730 that flicker due to the light source occurs, the image capturing apparatus 100 may control an exposure start time of an imaging device in order to avoid and/or reduce flicker occurrence due to the light source (operation S740).

When it is determined in operation S730 that flicker due to the light source does not occur, the image capturing apparatus 100 may control the imaging device according to a previously set method without separately determining an exposure time of the imaging device for avoiding and/or reducing flicker occurrence, thereby allowing image capturing to proceed (operation S750).

Figure 8:
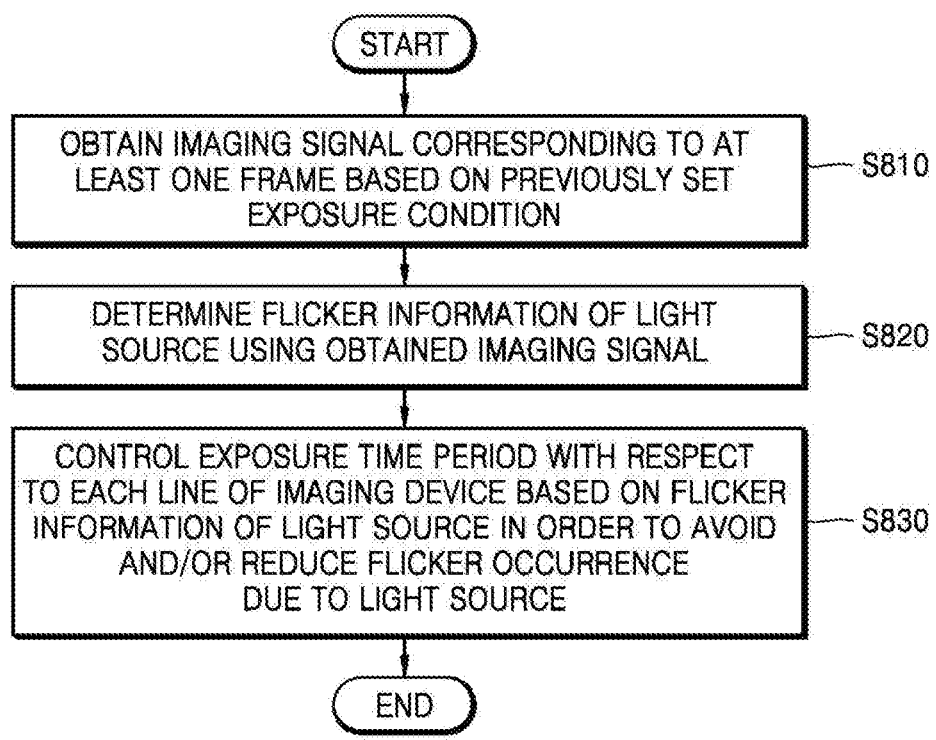
FIG. 8 is a flowchart illustrating an example method of operating an image capturing apparatus, according to an example embodiment.

FIG. 8 is a flowchart illustrating an example method of operating the image capturing apparatus 100.

The method of FIG. 8 may be performed by the image capturing apparatus 100 of FIG. 1, and repeated descriptions thereof will be omitted.

In operation S810, the image capturing apparatus 100 may obtain, based on a previously set exposure condition, an imaging signal that corresponds to at least one frame. The operation S810 may correspond to the operation S510 of FIG. 5, and thus, repeated descriptions thereof will be omitted.

In operation S820, the image capturing apparatus 100 may determine flicker information of a light source by using the imaging signal obtained in operation S810. The operation S820 may correspond to the operation S520 of FIG. 5, and thus, repeated descriptions thereof will be omitted.

In operation S830, the image capturing apparatus 100 may control, based on the flicker information of the light source that is determined in operations S820, an exposure time period with respect to each line of an imaging device in order to avoid and/or reduce flicker occurrence due to the light source. According to an embodiment, the image capturing apparatus 100 may determine a degree of change in brightness of each line of the imaging device during a process of determining flicker information of the light source, based on an imaging signal that corresponds to at least one frame, the imaging signal previously obtained in liveview. Next, the image capturing apparatus 100 may determine an exposure time period with respect to each line of the imaging device, which may compensate the degree of change in brightness of each line of the imaging device and may control the imaging device with the determined exposure time period of each line. Accordingly, the image capturing apparatus 100 may control the imaging device with the determined exposure time period of each line, and the imaging device may obtain an imaging signal that corresponds to a frame of uniform brightness.

Figure 9:
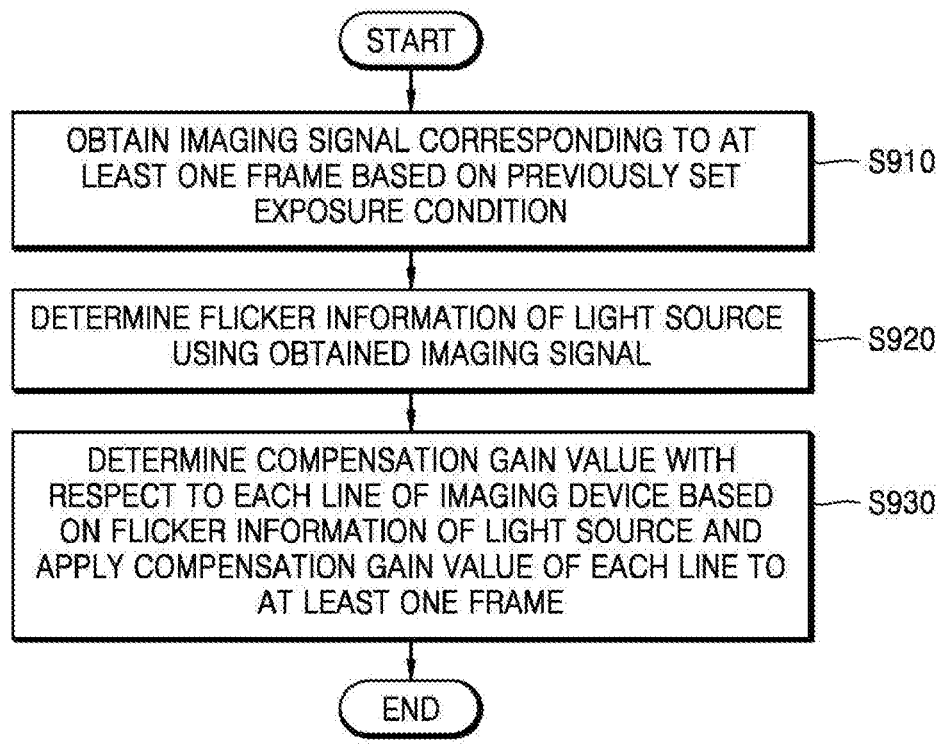
FIG. 9 is a flowchart illustrating an example method of operating an image capturing apparatus, according to an example embodiment.

FIG. 9 is a flowchart illustrating an example method of operating the image capturing apparatus 100.

The method of FIG. 9 may be performed by the image capturing apparatus 100 of FIG. 1, and repeated descriptions thereof will be omitted.

In operation S910, the image capturing apparatus 100 may obtain, based on a previously set exposure condition, an imaging signal that corresponds to at least one frame. The operation S910 may correspond to the operation S510 of FIG. 5, and thus, repeated descriptions thereof will be omitted.

In operation S920, the image capturing apparatus 100 may determine flicker information of a light source by using the imaging signal obtained in operation S910. The operation S920 may correspond to the operation S520 of FIG. 5, and thus, repeated descriptions thereof will be omitted.

In operation S930, the image capturing apparatus 100 may determine, based on the flicker information of the light source that is determined in operation S920, a compensation gain value with respect to each line of an imaging device and may apply the determined compensation gain value to at least one frame that is previously obtained. According to an embodiment, the image capturing apparatus 100 may determine a degree of change in brightness of each line of the imaging device during a process of determining flicker information of the light source, based on a previously obtained imaging signal that corresponds to at least one frame. Next, the image capturing apparatus 100 may determine a compensation gain value of each line that may compensate the degree of change in brightness of each line of the imaging device, and may apply the determined compensation gain value of each line to the previously obtained imaging signal that corresponds to the at least one frame. Accordingly, by applying a determined compensation gain value to at least one frame that is previously obtained, the image capturing apparatus 100 may remove flicker of the at least one frame previously obtained.

Figure 10:
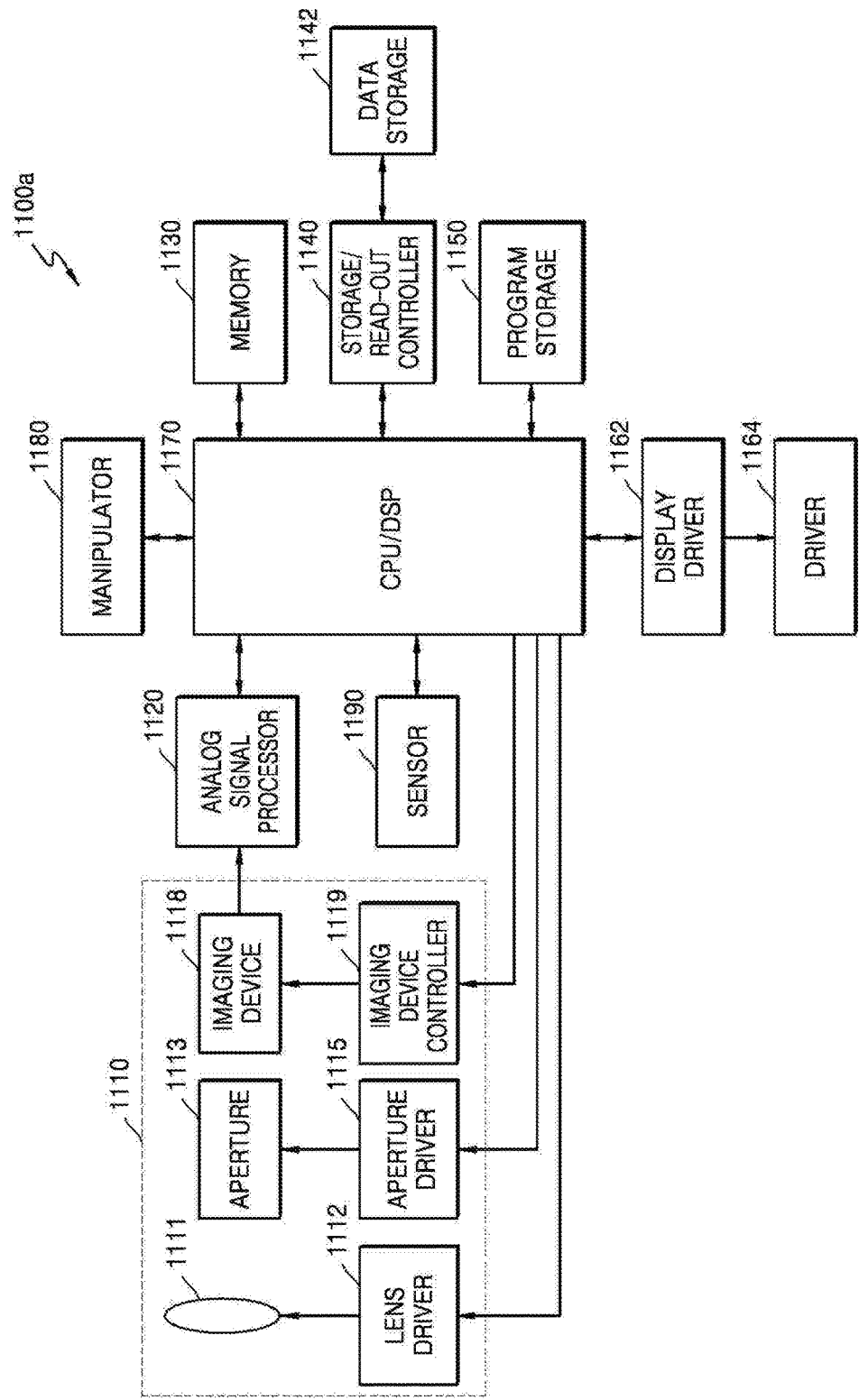
FIG. 10 is a block diagram illustrating an example image capturing apparatus according to another example embodiment.

FIG. 10 is a block diagram illustrating an example image capturing apparatus 1100a according to another example embodiment.

According to an embodiment, the image capturing apparatus 1100*a* may include an image capturing unit 1110, an analog signal processor 1120, a memory 1130, a storage/read-out controller 1140, a data storage 1142, a program storage 1150, a display driver 1162, a display 1164, a central processing unit/digital signal processor (CPU/DSP) 1170, a manipulator (e.g., including input circuitry) 1180, a quick-view image generator 1192, and a quick-view image buffer 1194. FIG. 10 illustrates the image capturing apparatus 1100*a* including only the elements related to the present embodiment. However, it will be understood by one of ordinary skill in the art related to the present embodiment that the image capturing apparatus 1100*a* may further include other general-purpose elements in addition to the elements illustrated in FIG. 10.

An imaging device 1118 may correspond to the imaging device 110 of FIG. 1, the CPU/DSP 1170 may correspond to the flicker information determiner 120 or the imaging device controller 130 of FIG. 1, an imaging device controller 1119 may correspond to the imaging device controller 130 of FIG. 1, and thus, repeated descriptions thereof will be omitted.

The CPU/DSP 1170 may control an overall operation of the image capturing apparatus 1100*a*. The CPU/DSP 1170 may provide control signals for operations of elements included in the image capturing apparatus 1100*a*, such as a lens driver 1112, an aperture driver 1115, the imaging device controller 1119, the display driver 1162, and the manipulator 1180.

The image capturing unit 1110 may be configured to convert incident light into an electrical signal and generate an image corresponding to the electrical signal. The image capturing unit 1110 may include a lens 1111, the lens driver 1112, an aperture 1113, the aperture driver 1115, the imaging device 1118, and the imaging device controller 1119.

The lens 1111 may include a plurality of lens groups, each of which includes a plurality of lenses. A position of the lens 1111 may be adjusted by the lens driver 1112. The lens driver 1112 adjusts the position of the lens 1111 according to the control signal provided by the CPU/DSP 1170.

The aperture driver 1115 may adjust a degree of opening of the aperture 1113 so as to adjust an amount of light incident on the imaging device 1118.

An optical signal passing through the lens 1111 and the aperture 1113 may form a subject image on a light-receiving surface of the imaging device 1118. The imaging device 1118 may be a charge coupled device (CCD) image sensor or a complementary metal oxide semiconductor image sensor (CIS) configured to convert the optical signal into an electrical signal. The imaging device 1118 may have sensitivity, etc. adjusted by the imaging device controller 1119. The imaging device controller 1119 may control the imaging device 1118 according to a control signal automatically generated by an image signal input in real-time or a control signal manually input by manipulation of a user.

An exposure time period of the imaging device 1118 may be adjusted by a shutter (not shown). The shutter (not shown) may include a mechanical shutter that adjusts incidence of light by moving a shade and an electronic shutter that controls exposure by supplying an electric signal.

The analog signal processor 1120 may perform noise reduction, gain control, waveform shaping, and analog-to-digital conversion on an analog signal provided from the imaging device 1118.

A signal processed by the analog signal processor 1120 may be input to the CPU/DSP 1170 directly or through the memory 1130. In this regard, the memory 1130 may operate as a main memory of the image capturing apparatus 1100*a* and may temporarily store information necessary during the operation of the CPU/DSP 1170. The program storage 1150 stores programs such as an operating system and an application system for driving the image capturing apparatus 1100*a*.

Furthermore, the image capturing apparatus 1100*a* may include the display 1164 to display an operating state of the image capturing apparatus 1100*a* or image information acquired by the image capturing apparatus 1100*a*. The display 1164 may provide visual information and/or auditory information to a user. In order to provide the visual information, the display 1164 may include, for example, a liquid crystal display (LCD) panel, an organic light-emitting diode (OLED) panel, or the like.

In addition, the image capturing apparatus 1100*a* may include two or more displays 1164, which may be touch-screens capable of recognizing touch inputs. For example, the image capturing apparatus 1100*a* may include a display for displaying a liveview image that shows a subject for capturing an image and a display for displaying an image that shows a state of the image capturing apparatus 1100*a*.

The display driver 1162 may provide a driving signal to the display 1164.

The CPU/DSP 1170 may process an input image signal and control each configuration of the image capturing apparatus 1100*a* according to the processed image signal or an external input signal. The CPU/DSP 1170 may perform image signal processing for image quality enhancement, such as noise reduction, gamma correction, color filter array interpolation, color matrix, color correction, and color enhancement, with respect to input image data. In addition, the CPU/DSP 1170 may compress image data generated by performing the image signal processing for image quality enhancement into an image file or may reconstruct the image data from the image file. An image compression format may be reversible or irreversible. For example, a still image may be compressed into a Joint Photographic Experts Group (JPEG) format or a JPEG 2000 format. In the case of recording a video image, a plurality of frames may be compressed into a video file in accordance with the Moving Picture Experts Group (MPEG) standard. For example, an image file may be generated in accordance with the exchangeable image file format (Exif) standard.

Image data output from the CPU/DSP 1170 may be input to the storage/read-out controller 1140 directly or through the memory 1130. The storage/read-out controller 1140 may store the image data in the data storage 1142 automatically or according to a signal input by the user. In addition, the storage/read-out controller 1140 may read data related to an image from an image file stored in the data storage 1142 and may input the data to the display driver 1162 through the memory 1130 or another path so as to display the image on the display 1164. The data storage 1142 may be detachably or permanently attached to the image capturing apparatus 1100*a*.

In addition, the CPU/DSP 1170 may perform sharpness processing, chromatic processing, blurring processing, edge emphasis processing, image interpretation processing, image recognition processing, image effect processing, and the like. The image recognition processing may include face recognition processing and scene recognition processing. Furthermore, the CPU/DSP 1170 may perform display image signal processing for display on the display 1164. For example, the CPU/DSP 1170 may perform luminance level adjustment, color correction, contrast adjustment, contour emphasis adjustment, screen splitting, character image generation, and image synthesis. The CPU/DSP 1170 may be connected to an external monitor and perform predetermined image signal processing for display on the external monitor. The CPU/DSP 1170 may transmit image data processed in such way to the external monitor so that an image corresponding to the processed image data is displayed on the external monitor.

The CPU/DSP 1170 may generate control signals for controlling auto focusing, zoom adjustment, focus adjustment, automatic exposure compensation, and the like by executing the program stored in the program storage 1150 or by using a separate module and provide the control signals to the aperture driver 1115, the lens driver 1112, and the imaging device controller 1119, and may control the overall operations of the elements included in the image capturing apparatus 1100*a*, such as a shutter and a stroboscope.

The manipulator 1180 may include input circuitry configured to allow a user to input a control signal. The manipulator 1180 may include various input circuitry including, for example, function buttons, such as a shutter-release button for inputting a shutter-release signal that allows an image to be captured by exposing the imaging device 1118 to light for an appointed time period, a power button for inputting a control signal for controlling on-off of power, a zoom button that allows an angle of view to widen or narrow according to an input, a mode selection button, and an extra image-capturing setting adjustment button. The manipulator 1180 may be in any form that allows the user to input a control signal, such as a button, a keyboard, a touch pad, a touchscreen, or a remote controller.

A sensor 1190 may measure physical quantities or sense an operating state of the image capturing apparatus 1100*a* and thus may convert measured or sensed information into an electrical signal. An example of the sensor 1190 that may be included in the image capturing apparatus 1100*a* will be described later with reference to FIG. 11. The sensor 1190 may further include a control circuit for controlling at least one sensor included therein. In some embodiments, the image capturing apparatus 1100*a* may further include a processor configured to control the sensor 1190, as a part of the CPU/DSP 1170 or separately from the CPU/DSP 1170, so that the sensor 1190 is controlled when the CPU/DSP 1170 is in a sleep state.

The image capturing apparatus 1100*a* of FIG. 10 is an example of configurations necessary to capture an image, and the image capturing apparatus 1100*a* according to some embodiments is not limited to the image capturing apparatus 1100*a* of FIG. 10.

Figure 11:
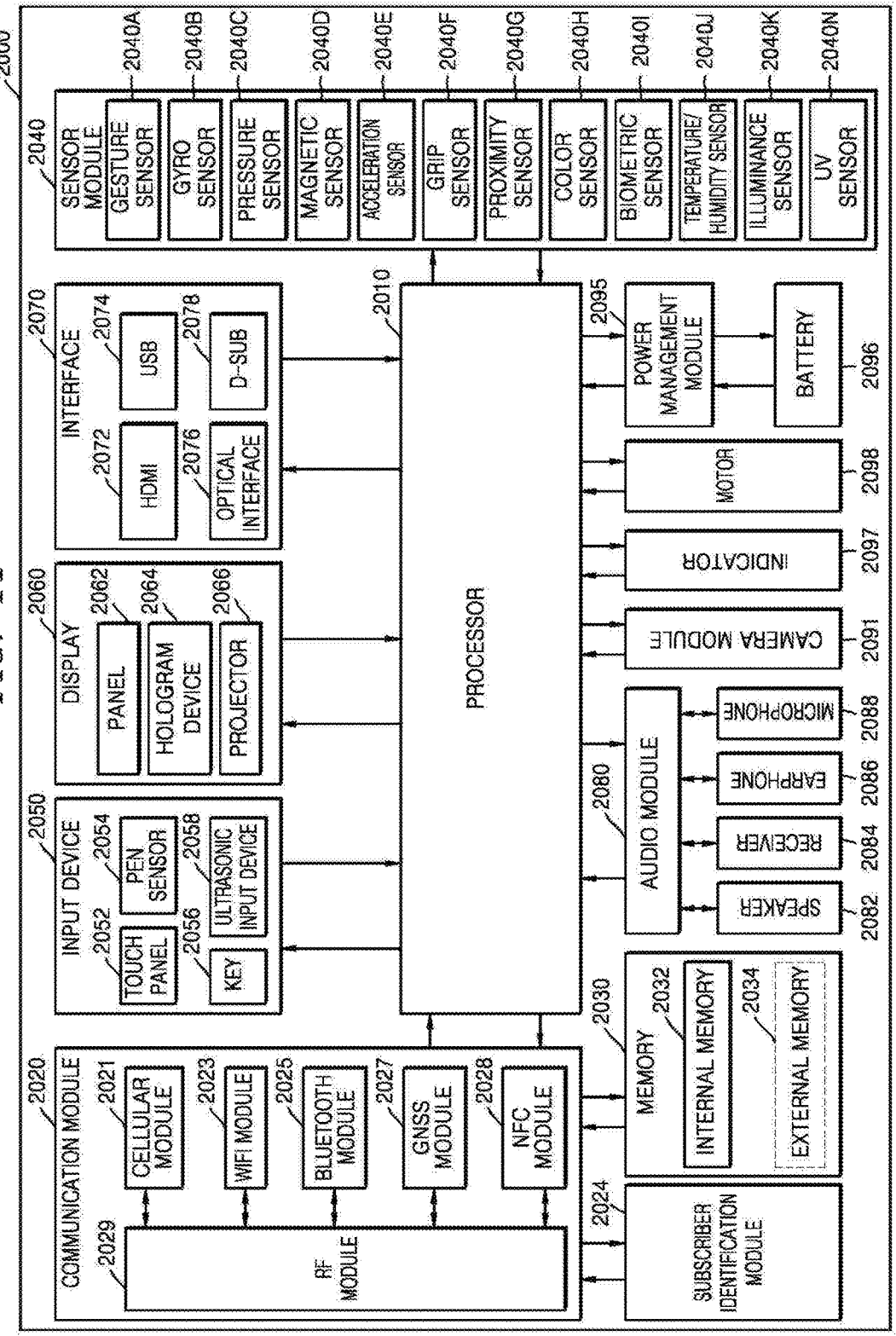
FIG. 11 is a block diagram illustrating an example configuration of another example of an image capturing apparatus according to some example embodiments.

FIG. 11 is a block diagram illustrating another example of an image capturing apparatus according to some example embodiments.

For example, an electronic apparatus 2000 may include all or part of the elements of the image capturing apparatus 100 and 1100*a* illustrated in FIGS. 1 to 10. The electronic apparatus 2000 may include at least one processor (for example, CPU/DSP or application processor (AP)) 2010, a communication module (e.g., including communication circuitry) 2020, a subscriber identification module 2024, a memory 2030, a sensor module 2040, an input device 2050, a display 2060, an interface 2070, an audio module 2080, a camera module 2091, a power management module 2095, a battery 2096, an indicator 2097, and a motor 2098.

The processor 2010 may execute an operating system or an application program to control a plurality of hardware or software components connected thereto, and may perform a variety of data processing and arithmetic operations. The processor 2010 may be implemented, for example, by a system on chip (SoC). According to an embodiment, the processor 2010 may further include a graphics processing unit (GPU) and/or an image signal processor. The processor 2010 may include at least some (for example, a cellular module 2021) of the elements illustrated in FIG. 11. The processor 2010 may load a command or data received from at least one of other elements (for example, non-volatile memory), process the loaded command or data, and store various data in the non-volatile memory.

The communication module 2020 may include, for example, various communication circuitry, such as, for example, the cellular module 2021, a wireless fidelity (Wi-Fi) module 2023, a Bluetooth module 2025, a global navigation satellite system (GNSS) module 2027 (for example, a GPS module, a Glonass module, a Beidou module, or a Galileo module), a near-field communication (NFC) module 2028, and a radio frequency (RF) module 2029.

The cellular module 2021 may provide a voice call, a video call, a text service, an Internet service, or the like via a communication network. According to an embodiment, the cellular module 2021 may perform distinction and authentication of the electronic apparatus 2000 within the communication network by using the subscriber identification module 2024 (for example, a SIM card). According to an embodiment, the cellular module 2021 may perform at least some of the functions that may be provided by the processor 2010. According to an embodiment, the cellular module 2021 may include a communication processor (CP).

Each of the Wi-Fi module 2023, the Bluetooth module 2025, the GNSS module 2027, and the NFC module 2028 are examples of communication circuitry and may include, for example, a processor for processing data transmitted and received through a corresponding module. According to some embodiments, at least some (for example, two or more) of the cellular module 2021, the Wi-Fi module 2023, the Bluetooth module 2025, the GNSS module 2027, and the NFC module 2028 may be included in one integrated chip (IC) or IC package.

The RF module 2029 may transmit and receive, for example, communication signals (for example, RF signals). The RF module 2029 may include, for example, a transceiver, a power amp module (PAM), a frequency filter, a low noise amplifier (LNA), an antenna, or the like. According to another embodiment, at least one of the cellular module 2021, the Wi-Fi module 2023, the Bluetooth module 2025, the GNSS module 2027, and the NFC module 2028 may transmit and receive RF signals through a separate RF module.

The subscriber identification module 2024 may include, for example, a card and/or embedded SIM that includes a subscriber identification module, and may include unique identification information (for example, integrated circuit card identifier (ICCID)) or subscriber information (for example, international mobile subscriber identity (IMSI)).

The memory 2030 may include, for example, an internal memory 2032 or an external memory 2034. The internal memory 2032 may include, for example, at least one of a volatile memory (for example, dynamic random access memory (DRAM), static RAM (SRAM), synchronous DRAM (SDRAM), etc.), a non-volatile memory (for example, one time programmable read-only memory (OTPROM), programmable ROM (PROM), erasable and programmable ROM (EPROM), electrically erasable and programmable ROM (EEPROM), mask ROM, flash ROM, flash memory (for example, NAND flash, NOR flash, etc.), hard disk drive (HDD), and solid state drive (SSD)).

The external memory 2034 may include a flash drive, for example, compact flash (CF), secure digital (SD), micro secure digital (micro-SD), mini secure digital (mini-SD), extreme digital (xD), multi-media card (MMC), memory stick, or the like. The external memory 2034 may be functionally and/or physically connected to the electronic apparatus 2000 via various interfaces.

The sensor module 2040, for example, may measure physical quantities or sense an operating state of the electronic apparatus 2000 and thus may convert measured or sensed information into an electrical signal. The sensor module 2040 may include, for example, at least one of a gesture sensor 2040A, a gyro sensor 2040B, a pressure sensor 2040C, a magnetic sensor 2040D, an acceleration sensor 2040E, a grip sensor 2040F, a proximity sensor 2040G, a color sensor 2040H (for example, a red, green and blue (RGB) sensor), a biometric sensor 2040I, a temperature/humidity sensor 2040J, an illumination sensor 2040K, and an ultraviolet (UV) sensor 2040M. Additionally or alternatively, the sensor module 2040 may include, for example, an E-nose sensor, an electromyography (EMG) sensor, an electroencephalogram (EEG) sensor, an electrocardiogram (ECG) sensor, an infrared (IR) sensor, an iris sensor and/or fingerprint sensor. The sensor module 2040 may further include a control circuit for controlling at least one sensor included therein. In some embodiments, the electronic apparatus 2000 may further include a processor configured to control the sensor module 2040, as a part of the processor 2010 or separately from the processor 2010, so that the sensor module 2040 is controlled when the processor 2010 is in a sleep state.

The input device 2050 may include, for example, a touch panel 2052, a (digital) pen sensor 2054, a key 2056, or an ultrasonic input device 2058. The touch panel 2052 may be, for example, at least one of a capacitive touch panel, a resistive touch panel, an infrared touch panel, and an ultraviolet touch panel. In addition, the touch panel 2052 may further include a control circuit. The touch panel 2052 may further include a tactile layer configured to provide a tactile response to a user.

The (digital) pen sensor 2054, for example, may be a part of the touch panel 2052 or may include a separate recognition sheet. The key 2056 may include, for example, a physical button, an optical key, or a keypad. The ultrasonic input device 2058 may sense an ultrasonic wave generated by an input tool through a microphone 2088 and check data corresponding to the sensed ultrasonic wave.

The display 2060 (for example, the display 164) may include a panel 2062, a hologram device 2064, or a projector 2066. The panel 2062 may be, for example, implemented to be flexible, transparent, or wearable. The panel 2062 and the touch panel 2052 may be configured as one module. The hologram device 2064 may show a three-dimensional image in the air by using interference of light. The projector 2066 may display an image by projecting light onto a screen. The screen may be, for example, at the inside or outside of the electronic apparatus 2000. According to an embodiment, the display 2060 may further include a control circuit for controlling the panel 2062, the hologram device 2064, or the projector 2066.

The interface 2070 may include, for example, high-definition multimedia interface (HDMI) 2072, universal serial bus (USB) 2074, optical interface 2076, or D-subminiature (D-sub) 2078. Additionally or alternatively, the interface 2070 may include, for example, mobile high-definition link (MHL) interface, SD card/multi-media card (MMC) interface, or infrared data association (IrDA) standard interface.

The audio module 2080, for example, may perform bidirectional conversion between a sound and an electrical signal. The audio module 2080 may be, for example, configured to process sound information input or output through a speaker 2082, a receiver 2084, an earphone 2086, the microphone 2088, or the like.

The camera module 2091 may be, for example, configured to capture a still image and a video image. According to an embodiment, the camera module 2091 may include one or more image sensors (for example, a front sensor or a rear sensor), a lens, an image signal processor (ISP), or a flash (for example, a light-emitting diode (LED) or xenon lamp, etc.).

The power management module 2095 may be, for example, configured to manage power of the electronic apparatus 2000. According to an embodiment, the power management module 2095 may include a power management integrated circuit (PMIC), a charger integrated circuit (IC), or a battery or fuel gauge. The PMIC may use a wired and/or wireless charging method. The wireless charging method may include, for example, a magnetic resonance method, a magnetic induction method, an electromagnetic wave method, or the like and may further include an additional circuit for wireless charging, for example, a coil loop, a resonance circuit, a rectifier, or the like. The battery gauge may be, for example, configured to measure a residual capacity, a charged voltage, a current, or a temperature of the battery 2096. The battery 2096 may include, for example, a rechargeable battery and/or solar battery.

The indicator 2097 may be configured to display specific states of all or part (e.g., the processor 2010) of the elements of the electronic apparatus 2000, for example, booting states, message states, or charging states. The motor 2098 may be configured to convert an electrical signal into a mechanical vibration and generate a vibration or haptic effect. Although not illustrated in FIG. 11, the electronic apparatus 2000 may include a processor (for example, GPU) for supporting a mobile television (TV). The processor for supporting a mobile TV, for example, may process media data according to a standard of digital multimedia broadcasting (DMB), digital video broadcasting (DVB), Media-Flo™, or the like.

The elements described in the present disclosure may be configured by one or more components, and the names of the elements may be changed according to the type of the electronic apparatus. According to various embodiments, the electronic apparatus may be configured to include at least one of the elements described in the present disclosure, some elements may be omitted, or additional components may be further included. Some of the elements of the electronic apparatus according to various embodiments may be combined into one entity and perform the same functions as the previous elements prior to the combination.

The apparatus according to one or more of the above present embodiments may include a processor, a memory for storing and executing program data, a permanent storage such as a disk drive, a communication port for handling communications with external devices, and a user interface device such as a touch panel, a key, or a button, etc. Any processes may be implemented as software modules or algorithms and may be stored as program instructions or computer readable codes executable by a processor on a computer-readable medium, such as a magnetic storage medium (for example, read-only memory (ROM), random-access memory (RAM), floppy disk, hard disk, etc.) and an optical reading medium (for example, CD-ROM, digital versatile disc (DVD), etc). The computer readable recording medium may also be distributed over network coupled computer systems so that the computer readable code is stored and executed in a distributed fashion. This media may be read by the computer, stored in the memory, and executed by the processor.

The present embodiments may be described in terms of functional block components and various processing steps. Such functional blocks may be realized by any number of hardware and/or software components configured to perform specified functions. For example, the present embodiments may employ various integrated circuit components, e.g., memory elements, processing elements, logic elements, look-up tables, and the like, which may carry out a variety of functions under the control of one or more microprocessors or other control devices. Similarly, where the elements of the present embodiments may be implemented using software programming or software elements the embodiments may be implemented with any programming or scripting language, such as C, C++, Java, assembler, or the like, with the various algorithms being implemented with any combination of data structures, objects, processes, routines or other programming elements. Functional aspects may be implemented in algorithms that execute on one or more processors. Furthermore, the present embodiments may employ any number of conventional techniques for electronics configuration, signal processing and/or control, data processing and the like. Terms such as "mechanism", "element", "means," and "configuration" may be used broadly and are not limited to mechanical or physical embodiments, but may include software routines in conjunction with processors, etc.

The particular implementations illustrated and described herein are illustrative examples and are not intended to otherwise limit the technical scope in any way. For the sake of brevity, conventional electronics, control systems, software development and other functional aspects of the systems may not be described in detail. Furthermore, the connecting lines or connectors shown in the various figures presented are intended to represent example functional relationships and/or physical or logical couplings between the various elements. It should be noted that many alternative or additional functional relationships, physical connections or logical connections may be present in a practical device.

The terms "a" and "an" and "the" and similar referents used herein (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the description as if it were individually recited herein. Finally, the operations of all methods described herein may be performed in any suitable order unless otherwise indicated herein or otherwise clearly contradicted by context. The use of any and all examples, or example language (e.g., "such as") provided herein, is intended merely to better illuminate the technical spirit and does not pose a limitation on the disclosure unless otherwise claimed. Numerous modifications, combinations, and adaptations will be readily apparent to those of ordinary skill in this art without departing from the spirit and scope.

What is claimed is:

1. An image capturing apparatus comprising:
   an imaging device configured to obtain, based on a previously set exposure condition, an imaging signal that corresponds to at least one frame;
   a flicker information determining circuitry configured to determine flicker information of a light source using the imaging signal that corresponds to the at least one frame; and
   a controller configured to control, based on the flicker information of the light source, an exposure start time of the imaging device to take into account flicker occurrence due to the light source, wherein the controller is further configured to determine, based on the flicker information of the light source, a compensation gain value on a line-by-line basis with respect to each line of the imaging device and to apply the compensation gain value of each line to the at least one frame.

2. The apparatus of claim 1, wherein the controller is configured to control, based on the flicker information of the light source, an exposure time period with respect to each line of the imaging device.

3. The apparatus of claim 1, wherein the controller is configured to determine, based on the flicker information of the light source, an exposure start time and to control the exposure start time of the imaging device based on the determined exposure start time.

4. The apparatus of claim 1, wherein the controller is configured to determine, in a liveview mode, an exposure time period and exposure start time for the flicker occurrence with respect to the light source, and
   the imaging device is configured to obtain, based on the determined exposure time period and exposure start time, the imaging signal that corresponds to the at least one frame.

5. The apparatus of claim 4, wherein the controller is configured to determine the exposure time period and exposure start time by maintaining or changing a liveview frames per second (FPS) rate.

6. The apparatus of claim 1, wherein the controller is configured to determine, based on the flicker information of the light source, whether flicker due to the light source has occurred in the at least one frame, and
   the controller is further configured to control, when it is determined that the flicker due to the light source has occurred, the exposure start time of the imaging device.

7. The apparatus of claim 1, wherein the flicker information of the light source comprises at least one of phase information of the light source, power frequency information of the light source, amplitude information of the light source, and average brightness information of the light source.

8. The apparatus of claim 1, wherein the exposure start time of the imaging device comprises a time at which a central region of the imaging device receives a brightest light.

9. The apparatus of claim 1, wherein the imaging device is configured to obtain, based on the exposure start time controlled by the controller, an imaging signal that corresponds to a still image or video image,
   the flicker information determining circuitry is configured to update the flicker information of the light source using the imaging signal that corresponds to the still image or video image, and
   the controller is configured to control, based on the updated flicker information of the light source, the exposure start time of the imaging device.

10. The apparatus of claim 1, wherein the imaging device is configured to obtain, based on the exposure start time controlled by the controller, an imaging signal that corresponds to a still image or video image, and the controller is further configured to control, based on a position of a brightest line of lighting detected in the still image or video image, the exposure start time of the imaging device.

11. The apparatus of claim 1, wherein the imaging device is configured to obtain, based on the previously set exposure condition, an imaging signal that corresponds to a partial region of the at least one frame, and the flicker information determining circuitry is configured to determine the flicker information of the light source using the imaging signal that corresponds to the partial region of the at least one frame.

12. An image capturing apparatus comprising:

an imaging device configured to obtain, based on a previously set exposure condition, an imaging signal that corresponds to at least one frame;

a flicker information determining circuitry configured to determine flicker information of a light source using the imaging signal that corresponds to the at least one frame; and a controller configured to control, based on the flicker information of the light source, an exposure time period with respect to each line of the imaging device in order to take into account flicker occurrence due to the light source, wherein the controller is further configured to determine, based on the flicker information of the light source, a compensation gain value on a line-by-line basis with respect to each line of the imaging device and to apply the compensation gain value of each line to the at least one frame.

13. A method of operating an image capturing apparatus, the method comprising:

obtaining, based on a previously set exposure condition, an imaging signal that corresponds to at least one frame;

determining flicker information of a light source using the imaging signal that corresponds to the at least one frame;

controlling, based on the flicker information of the light source, an exposure start time of the imaging device in order to take into account flicker occurrence due to the light source, and controlling, based on the flicker information of the light source, a compensation gain value on a line-by-line basis with respect to each line of the imaging capturing apparatus and applying the compensation gain value of each line to the at least one frame.

14. The method of claim 13, further comprising controlling, based on the flicker information of the light source, an exposure time period with respect to each line of the imaging device.

15. The method of claim 13, wherein the controlling comprises:

determining, based on the flicker information of the light source, an exposure start time; and controlling the exposure start time of the imaging device based on the determined exposure start time.

16. The method of claim 13, wherein the obtaining comprises:

determining, in a liveview mode, an exposure time period and exposure start time for the flicker occurrence with respect to the light source; and obtaining, based on the determined exposure time period and exposure start time, the imaging signal that corresponds to the at least one frame.

17. The method of claim 16, wherein the determining of the exposure time period and exposure start time in the liveview mode comprises determining the exposure time period and exposure start time by maintaining or changing a liveview frames per second (FPS) rate.

18. A non-transitory computer-readable recording medium having recorded thereon a program for implementing, when performed by a computer, the method of claim 13.

* * * * *